(12) United States Patent
Morizawa et al.

(10) Patent No.: US 8,269,420 B2
(45) Date of Patent: Sep. 18, 2012

(54) ILLUMINATING DEVICE HAVING FLUORESCENT LAMP, DISPLAY APPARATUS INCLUDING THE SAME, AND LIGHT-DIFFUSING FILM

(75) Inventors: Kazuhiko Morizawa, Miyagi (JP); Sung-kil Lee, Miyagi (JP); Takahiro Igarashi, Kanagawa (JP); Tsuneo Kusunoki, Tokyo (JP)

(73) Assignee: Sony Corporation, Tokyo (JP)

( * ) Notice: Subject to any disclaimer, the term of this patent is extended or adjusted under 35 U.S.C. 154(b) by 751 days.

(21) Appl. No.: 12/247,359

(22) Filed: Oct. 8, 2008

(65) Prior Publication Data

US 2009/0129055 A1    May 21, 2009

(30) Foreign Application Priority Data

Oct. 12, 2007 (JP) ................. 2007-266371
Aug. 21, 2008 (JP) ................. 2008-212774

(51) Int. Cl.
*H01J 29/88* (2006.01)
(52) U.S. Cl. ..................... 313/635; 313/479
(58) Field of Classification Search .......... 313/461, 313/636, 463, 467, 479, 480, 525, 483, 485–487, 313/635; 362/217.02, 217.08, 235, 246, 362/255, 256, 260, 355
See application file for complete search history.

(56) References Cited

U.S. PATENT DOCUMENTS

| 4,001,628 | A | * | 1/1977 | Ryan | ............................. 313/487 |
| 2004/0169456 | A1 | * | 9/2004 | Scholl et al. | .................. 313/485 |
| 2008/0170176 | A1 | * | 7/2008 | Shen | ............................. 349/64 |

FOREIGN PATENT DOCUMENTS

| JP | 360049551 | * | 3/1985 |
| JP | 04-370650 | | 12/1992 |
| JP | 10-069889 | | 3/1998 |
| JP | 2005126518 A | * | 5/2005 |

OTHER PUBLICATIONS

A special feature Image information media annual p. 1169-p. 1172.
High-resolution OCB liquid crystal technology p. 44-p. 45.
A phosphor handbook p. 65-p. 66.

* cited by examiner

*Primary Examiner* — Joseph L Williams
*Assistant Examiner* — Fatima Farokhrooz
(74) *Attorney, Agent, or Firm* — SNR Denton US LLP

(57) ABSTRACT

An illuminating device includes a fluorescent lamp including a blue phosphor and a red phosphor applied on an inner surface, the fluorescent lamp emitting blue light and red light from the blue phosphor and the red phosphor, respectively; and a green phosphor layer disposed outside the fluorescent lamp, the green phosphor layer containing a green phosphor containing $Eu^{2+}$ or $Ce^{3+}$ as a luminescent center. Green light emitted from the green phosphor excited by the blue light is mixed with the red light and the blue light so that white light is emitted from the illuminating device.

20 Claims, 12 Drawing Sheets

ILLUMINATING DEVICE HAVING FLUORESCENT LAMP, DISPLAY APPARATUS INCLUDING THE SAME, AND LIGHT-DIFFUSING FILM

CROSS REFERENCES TO RELATED APPLICATIONS

The present invention contains subject matter related to Japanese Patent Application JP 2007-266371 filed in the Japanese Patent Office on Oct. 12, 2007, the entire contents of which are incorporated herein by reference.

BACKGROUND OF THE INVENTION

1. Field of the Invention

The present invention generally relates to illuminating devices for use in display apparatuses such as liquid crystal televisions and the like. In particular, the present invention relates to an illuminating device having a fluorescent lamp, suitable for use in a display apparatus such as a liquid crystal television capable of high-speed moving image display, a display apparatus including the illuminating device, and a light-diffusing film used in the illuminating device.

2. Description of the Related Art

Fluorescent lamps are used in televisions and liquid crystal displays (LCDs) for personal computers (PCs). Typically, phosphors that respectively emit three types of light, i.e., blue light, green light, and red light (more than three types of light may be used depending on the type of display), are applied in the fluorescent lamp. The display colors of a LCD are usually produced by allowing white light emitted from a backlight, e.g., a fluorescent lamp (cold cathode fluorescent lamp (CCFL)), a hot cathode fluorescent lamp (HCFL), an external electrode fluorescent lamp (EEFL), a flat fluorescent lamp (FFL), or the like, to pass through blue, green, and red color filters.

In order to improve the performance of the LCD, various investigations have been conducted on liquid crystal materials, light-emitting diodes (LEDs) as the light sources for the backlights, fluorescent lamps, phosphors, driving systems, luminance degradation, color reproducibility, enlargement of color gamut, moving image display quality, and the like. For example, the moving image display quality has been improved by employing a 120 Hz drive or by employing a pseudo impulse display mode in which a liquid crystal having a high-speed response characteristic is used and in which a black-insertion technique and a blinking backlight technique are combined (e.g., refer to Special Report: Image Information Media Annual Report (*Tokushu Eizo Joho Media Nenpo*), Kurita et al., The Institute of Image Information and Television Engineers, Vol. 60, No. 8, pp. 1169 to 1177 (2006) (LCD, p. 1169 right column to p. 1172 left column), and High Imaging Quality based on Optically Compensated Bend Mode Liquid Crystal Technology, Takimoto et al., Toshiba Review, Vol. 60, No. 7, pp. 42 to 45 (2005) (Moving Image Quality Improving Technology (p. 44, left column to p. 45 left column, and FIGS. 6 to 9)).

The existing technology related to color quality of an illuminating device that uses a fluorescent lamp will now be described.

Japanese Unexamined Patent Application Publication No. 4-370650 ("'650 document" hereinafter) (paragraph 0009 to 0011, FIGS. 1 and 2) titled Color Sequential Illumination System contains following descriptions.

FIG. 11A is a schematic view of an embodiment of a lamp used in the color sequential illumination system according to '650 document and FIG. 11B is a cross-sectional view taken along line XIB-XIB in FIG. 11A. FIGS. 11A and 11B are FIGS. 1 and 2 of the '650 document, respectively.

Referring to FIGS. 11A and 11B, reference numeral 101 indicates illumination means such as a discharge lamp. This illumination means includes a glass envelope 102 the inside surface of which is coated with a blue phosphor material 104 in the form of a powder. The ends of the envelope 102 are sealed and contain electrodes 106 for exciting a discharge, for example an ultra-violet discharge, within a gas 108 contained within the glass envelope 102.

Around the outside of the glass envelope 102 is a dye-doped organic fluorescent material in the form of a plastics material. In operation of the illumination means, the discharge in the gas 108 causes generation of light within the glass envelope 102. This causes the blue phosphor powder 104 to emit blue light which in turn stimulates fluorescence within the fluorescent plastics material 110. In this case, the fluorescent plastics material 110 is chosen so as to have a color characteristic of a suitable wavelength, for example green or red.

Because the optical decay time of the organic fluorescent material 110 is substantially equivalent to that of the blue phosphor powder 104 (approximately 0.04 ms), the light emissions of both colors will no longer occur for a significant time after the illumination means has been switched off. Furthermore, since the decay times of blue, green and red light can be arranged to be substantially equal, the light emitted from a color sequential illumination system can be fully synchronized with the electrical signals used to control energisation of the lamps and a reduction in unwanted color mixing will result. The plastics material and the fluorescent dyes used to produce the organic fluorescent material 110 can degrade with prolonged exposure to relatively high levels of ultra-violet radiation, such as those arising from the discharge excited in the envelope 102. However, because the envelope 102 is constructed from glass, there is no need to filter out ultra-violet radiation as glass is a good absorber of such radiation.

Japanese Unexamined Patent Application Publication No. 10-69889 ('889 document) (paragraphs 0013 to 0016, FIG. 1) titled Variable Color Fluorescent Lamp contains following descriptions.

FIG. 12 is a schematic diagram showing one embodiment of a variable color fluorescent lamp according to '889 document. FIG. 12 is FIG. 1 in '889 document.

FIG. 12 shows a variable color fluorescent lamp of one embodiment that includes an outer tube 201, an inner tube 202, inner tube supporting plates 203, and electrodes 204*a*, 204*b*, 205*a*, and 205*b*.

The outer tube 201 is composed of, for example, glass, which is a light-transmitting member and has a shape of a cylinder having an inner diameter of about 30 mm and a length of about 1200 mm. A phosphor having a color temperature of 2800 K (not shown) is coated on the inner surface of the outer tube 201. The two ends of the outer tube 201 are sealed with end plates 206*a* and 206*b*, and the electrodes 204*a* and 205*a* are provided to the end plate 206*a* and the electrodes 204*b* and 205*b* are provided to the end plate 206*b*. An inert gas and a metal vapor, i.e., a mercury vapor, of several torrs are hermetically enclosed in the space inside the outer tube 201.

The inner tube 202 is composed of glass, i.e., a light-transmitting material, as with the outer tube 201. The inner tube 202 has a spiral shape and installed inside the outer tube 201. The inner tube 202 is obtained by processing a cylindrical member having an outer diameter of 12 mm into a spiral structure having a turn inner diameter of 5 mm and a length per turn of 150 mm. A blue green phosphor (not shown) having a chromaticity of (0.248, 0.346) is applied on the inner surface and a phosphor having a color temperature of 2800 K, which is the same as that of the phosphor applied on the outer tube 201, is applied on the outer surface. Furthermore, a pair of electrodes 205a and 205b are installed near the two ends inside the inner tube 202. The inner tube 202 is fixed to the inner tube supporting plates 203 so that the low points of the spiral structure abut the inner surface of the outer tube 201 every turn. Note that the space inside the inner tube 202 is arranged to form the same hermetically sealed space as that inside the outer tube 201.

The color variable fluorescent lamp having the above-described configuration has the outer tube 201 and the inner tube 202 lighted in parallel to each other via a light-control device (not shown) and controlled independently so that light of a desired color can be obtained. In this embodiment, a color temperature of 2800 K was obtained by lighting only the outer tube 201 and a color temperature of 6000 K was obtained by lighting both the outer tube 201 and the inner tube 202.

The physical explanation regarding the decay time of the phosphors is given in, for example, Phosphor Handbook edited by Keikotai Dou Gakkai and published by Ohmsha Ltd., first edition, pp. 65 to 66 (1987).

With regard to phosphor sheets, Japanese Unexamined Patent Application Publication Nos. 2007-86797 (paragraph 0065 to 0070 and 0077 to 0078), 2006-126109 (paragraph 0157), 2004-161808 (paragraphs 0067 to 0068, FIG. 1), and 2008-50593 (paragraphs 0006 to 0010, 0066, and 0085 to 0086, FIG. 3) provide descriptions.

SUMMARY OF THE INVENTION

In the description below, a phosphor that emits blue light is referred to as "blue phosphor", a phosphor that emits green light is referred to as "green phosphor", and a phosphor that emits red light is referred to as "red phosphor" for the sake of simplicity.

In the cases where fluorescent lamps are used as the backlights of LCDs and suppression of degradation of these lamps, in particular, luminance degradation, is desired, phosphors used in these lamps preferably have light fastness, moisture resistance, heat resistance, and the like; however, the organic fluorescent substance described in '650 document usually has low light fastness, moisture resistance, heat resistance, and the like. Thus, inorganic phosphors are widely used in fluorescent lamps.

One of the conditions desirable for a LCD having a backlight constituted by a fluorescent lamp to comply with fast moving images is that the decay time of the phosphor used in the fluorescent lamp is short. There is a technique for improving the moving image characteristic by allowing the fluorescent lamp to blink at 60 Hz to 120 Hz. However, blinking the fluorescent lamp at 60 Hz to 120 Hz does not much improve the moving image characteristic if the decay time of the phosphor used in the fluorescent lamp is long. This is because afterglow remains during the time zone in which the fluorescent lamp is turned off.

In other words, in high-speed moving image display in which a fluorescent lamp is switched ON and OFF (blinking) at a high frequency, the afterglow generated by turning the lamp OFF last time remains until the next time the lamp is turned ON if the decay time of the phosphor used in the fluorescent lamp is long. Thus, turning the lamp OFF makes little sense. In other words, blinking makes little contribution. Accordingly, in order to improve the color quality among the high-speed moving image characteristics of a liquid crystal device having a backlight that includes a fluorescent lamp, the phosphor used in the fluorescent lamp, in particular, the green phosphor having the largest spectral luminous efficiency, is desired to have a short decay time.

A blue phosphor widely used in CCFLs is $BaMgAl_{10}O_{17}$:Eu or $(Sr_x,Ba_y,Ca_z,Mg_{(1-x-y-z)})_5(PO_4)_3Cl$:Eu having a decay time on the order of microseconds. The decay time of a red phosphor, $Y_2O_3$:Eu or $YVO_4$:Eu used in CCFLs is on the order of milliseconds. As evident from the spectral luminous efficiency curve, the luminosity of the red light is about half that of the green light or less. In other words, the afterglow of the red light is not as noticeable as that of the green light even if the decay time is long. The decay time of the red phosphor used in cathode ray tubes, e.g., $Y_2O_2S$:Eu or $Y_2O_3$:Eu is also on the order of milliseconds. However, since the decay time of the blue and green phosphors is 20 μsec, the moving image characteristic has been satisfactory.

A phosphor used in a CCFL is desired to absorb UV radiation of 253.7 nm from mercury and efficiently emit light. There have been various proposals of green phosphors for use in CCFLs. Among these, $LaPO_4$:Tb and $BaMgAl_{10}O_{17}$:Eu, Mn are favored from the viewpoints of lifetime and efficiency. There are other green phosphors that have not yet been put into practice, and they also have $Tb^{3+}$ or $Mn^{2+}$ as the luminescent center. Fluorescent light from these phosphors is physically derived from the transition level of the luminescent center metal. Since the luminescent center is forbidden transition, the decay time is as long as on the order of milliseconds. Although the green phosphors $LaPO_4$:Ce,Tb and $BaMgAl_{10}O_{17}$:Eu,Mn are used in fluorescent lamps and have high emission intensity, the decay time is as long as on the order of milliseconds.

In a liquid crystal display for high-speed moving image display, the fluorescent lamp used as the backlight is desired to blink at a high frequency; thus, in order to ensure white light have good color purity, a phosphor having a short decay time is desirably used in the fluorescent lamp.

A phosphor having $Ce^{3+}$ or $Eu^{2+}$ as the luminescent center has a significantly short decay time on the order of nanoseconds to microseconds since the $Ce^{3+}$ or $Eu^{2+}$ is an allowed transition. Although a green phosphor having $Eu^{2+}$ in the luminescent center and emitting light by excitation with 253.7 nm UV light exists, a phosphor that is widely used from the viewpoints of efficiency and lifetime has not been found so far.

A phosphor layer can be formed on a substrate by applying a paste-like coating material containing phosphor particles; however, as the specific gravity and the particle diameter of the phosphor increase, the phosphor particles tend to more easily settle. Thus, it becomes difficult to prepare a coating material in which the phosphor is homogeneously dispersed. Accordingly, it is difficult to form a phosphor layer having a homogeneous composition and a uniform thickness by an application technique, and it is difficult to form a phosphor layer that can uniformly emit light. If such a phosphor layer is used as a light-diffusing layer for mixing light in the red (R), green (G), and blue (B) color regions, it is difficult to obtain a uniform light-diffusing effect and it is thus difficult to emit light having a uniform chromaticity and luminance from the light-diffusing layer.

In view of the above, a illuminating device including a fluorescent lamp that can improve the color quality of the high-speed moving image characteristics, a display apparatus including the illuminating device, and a light-diffusing film for used in the illuminating device are desired.

An illuminating device according to an embodiment includes a fluorescent lamp including a blue phosphor and a red phosphor applied on an inner surface, the fluorescent lamp emitting blue light and red light from the blue phosphor and the red phosphor, respectively; and a green phosphor layer disposed outside the fluorescent lamp, the green phosphor layer containing a green phosphor containing $Eu^{2+}$ or $Ce^{3+}$ as a luminescent center. Green light emitted from the green phosphor excited by the blue light is mixed with the red light and the blue light so that white light is emitted from the illuminating device.

According to this structure, the color purity of the white light emitted from the illuminating device is not degraded by the afterglow of the green light even when the fluorescent lamp is blinked at a high frequency, and the chromaticity remains the same. Thus, an illuminating device in which the moving image quality degradation is suppressed can be provided.

An light-diffusing film according to another embodiment includes a transparent sheet substrate; and a light-diffusing layer formed on the sheet substrate, the light-diffusing layer containing a resin binder and a green phosphor containing $Eu^{2+}$ or $Ce^{3+}$ as a luminescent center. The light-diffusing film is disposed outside a fluorescent lamp having an inner surface on which a blue phosphor and a red phosphor are applied so that the fluorescent lamp emits blue light and red light, and is used in an illuminating device that emits white light as green light emitted from the green phosphor excited by the blue light mixes with the red light and the blue light.

The light-diffusing film having the above-described structure is suitable for use in the illuminating device described above. The light-diffusing film achieves a substantially uniform light-diffusing effect and light having substantially uniform chromaticity and luminance can be emitted.

A display apparatus of yet another embodiment includes the illuminating device described above. Thus, blinking of emission by switching the backlight ON and OFF can be reliably performed. Thus, the color quality of the moving image characteristics can be improved, and a display apparatus for high-speed moving image display, in particular, a liquid crystal display apparatus, can be provided.

DESCRIPTION OF THE PREFERRED EMBODIMENTS

Figure 1A:
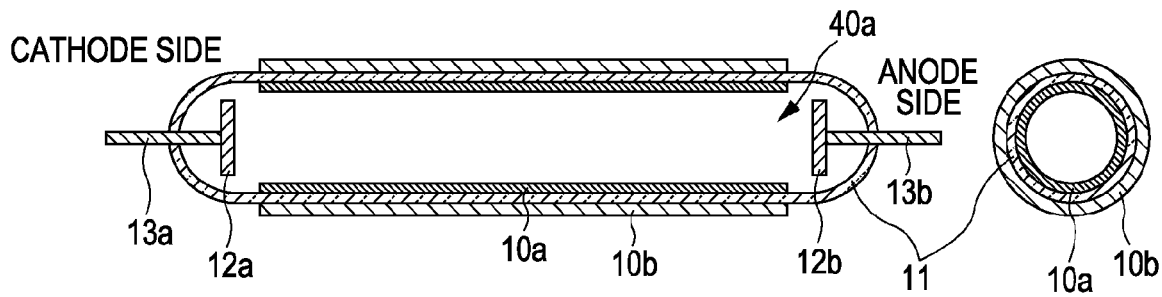
FIGS. 1A to 1D are cross-sectional views illustrating schematic structures of illuminating devices according to embodiments in which a green phosphor is disposed outside a fluorescent lamp.

An illuminating device according to one embodiment preferably has a green phosphor layer formed on an outer surface of a fluorescent lamp. With this structure, degradation of the green phosphor by ultraviolet is suppressed by using a UV-shielding material in a glass tube for the fluorescent lamp. Thus, the lifetime of the illuminating device can be extended. Moreover, if the lamp is of a type that uses mercury, a trouble such as a decrease in emission intensity by deposition of mercury on the phosphor can be avoided. The green phosphor is an inorganic phosphor having a luminescent center wavelength of 500 nm to 570 nm and has a short decay time, good light fastness, and good heat resistance.

The green phosphor layer is preferably formed on a light-diffusing plate disposed outside the fluorescent lamp. According to such a structure, the color purity of white light from the illuminating device can be adjusted to a desired level by selecting an appropriate type of green phosphor.

A green phosphor layer containing different types of green phosphors is preferably formed on the light-diffusing plate. In this manner, the color purity of white light from the illuminating device can be changed by using a plurality of phosphors having different chromaticities.

The green phosphor layer preferably has light diffusibility and preferably serves as a light-diffusing plate. In this manner, the green phosphor layer can serve as a light-diffusing plate that can emit fluorescent light having substantially uniform chromaticity and luminance and that can diffuse light substantially uniformly. Accordingly, there is no need to provide a light-diffusing plate separate from the green phosphor layer, and the structure of the illuminating device can be simplified.

The green phosphor layer preferably contains different types of green phosphors. In this manner, the green phosphor layer can serve as a light-diffusing plate that can emit fluorescent light having substantially uniform chromaticity and luminance and that can diffuse light substantially uniformly. Moreover, since a plurality of types of green phosphors are used, the color purity of the white light from the illuminating device can be changed.

The green phosphor layer preferably contains light-diffusing particles. In this manner, the green phosphor layer can form a light-diffusing plate having a more uniform light-diffusing effect.

The light-diffusing particles are preferably resin microparticles. In this manner, the green phosphor layer can be used as a light-diffusing plate having a more uniform light-diffusing effect at a lower cost.

The $\frac{1}{10}$ decay time of the green phosphor is preferably 0.2 msec or less. In this manner, even when the fluorescent lamp is switched ON and OFF (blinking) at a high frequency, e.g., 60 Hz to 120 Hz, the intensity of afterglow of green fluorescent light resulting from the last switching OFF added to the intensity of green fluorescent light emitted next time the lamp is turned ON is small. Thus, color purity of the white light emitted from the illuminating device is not degraded by the afterglow of the green light and the chromaticity remains unchanged. Thus, an illuminating device that can suppress degradation of color quality can be realized. Thus, the color quality of the moving image characteristic can be improved by using this illuminating device, and a liquid crystal display apparatus capable of high-speed moving image display can be realized. Note that a 1/10 decay time is the time taken for the luminance of fluorescent light to decrease to 1/10 the initial luminance from zero time, i.e., the time immediately after the excitation is stopped.

The 1/10 decay time of the green phosphor is more preferably 0.1 msec or less. In this manner, since the decay time of the green phosphor is as short as 0.1 msec or less, the intensity of afterglow of green fluorescent light resulting from the last switching OFF added to the intensity of green fluorescent light emitted next time the lamp is turned ON is smaller. Thus, an illuminating device that can suppress degradation of color quality can be realized. Accordingly, the color quality of the moving image characteristic can be further improved by using this illuminating device, and a liquid crystal display apparatus capable of high-speed moving image display at a higher frequency can be realized.

The green phosphor is preferably a rare earth aluminate phosphor, an alkaline earth metal aluminate phosphor, an alkaline earth metal silicate phosphor, an alkaline earth metal acid silicon nitride phosphor, or an alkaline earth metal gallium sulfide phosphor having a garnet structure. In this manner, the color purity of white light from the illuminating device can be adjusted to a desired level by selecting an appropriate type of green phosphor.

One of a cold cathode fluorescent lamp, a hot cathode fluorescent lamp, an external electrode fluorescent lamp, and an electrodeless fluorescent lamp may be used as the fluorescent lamp depending on the purpose.

The fluorescent lamp is preferably a cold cathode fluorescent lamp. In this manner, an illuminating device having a long life and high reliability can be realized since cold cathodes are used.

A light-diffusing film according to an embodiment preferably has a green phosphor layer containing different types of green phosphors. In this manner, the green phosphor layer can serve as a light-diffusing plate that can emit fluorescent light having substantially uniform chromaticity and luminance and that can diffuse light substantially uniformly. Moreover, since different types of green phosphors are used, the color purity of the white light from the illuminating device can be changed.

The light-diffusing layer preferably contains light-diffusing particles. In this manner, a light-diffusing plate having a more uniform light-diffusing effect can be realized.

The light-diffusing particles are preferably resin microparticles. In this manner, a light-diffusing plate having a more uniform light-diffusing effect can be realized at a lower cost.

The 1/10 decay time of the green phosphor is preferably 0.2 msec or less. In this manner, even when the fluorescent lamp is switched ON and OFF (blinking) at a high frequency, e.g., 60 Hz to 120 Hz, the intensity of afterglow of green fluorescent light resulting from the last switching OFF added to the intensity of green fluorescent light emitted next time the lamp is turned ON is small. Thus, color purity of the white light emitted from the illuminating device is not degraded by the afterglow of the green light and the chromaticity remains unchanged. Thus, this light-diffusing film is suitable for use in an illuminating device that can suppress degradation of color quality. Thus, the color quality of the moving image characteristic can be improved by using an illuminating device incorporating such a light-diffusing film, and a liquid crystal display apparatus capable of high-speed moving image display can be realized.

A display apparatus according to an embodiment preferably includes a liquid crystal panel. The liquid crystal display apparatus having the liquid crystal panel is suitable for televisions and displays for personal computers (PCs).

The illuminating device is preferably used as a backlight since the thickness and weight of the display apparatus can be reduced.

The display apparatus preferably further includes a pixel unit and ON-OFF of the pixel unit is preferably synchronized with blinking of the backlight. According to this structure, black image data is inserted into part of one frame (the region where the black mage data is inserted is referred to as "black-inserted area"), and in accordance to the timing of displaying the black image, the backlight at a position corresponding to the black-inserted area is turned OFF while being synchronized with the shift of the black-inserted area. In other words, the backlight at a position corresponding to the areas other than the black-inserted areas is turned ON and the backlight at a position corresponding to the black-inserted area is turned OFF. As a result, a liquid crystal display apparatus that can improve the color quality of the moving image characteristic and achieve high-speed moving image display can be realized.

A method for making an illuminating device according to one embodiment has the following features.

(1) A method for making an illuminating device includes steps of preparing a fluorescent lamp having an inner surface on which a blue phosphor and a red phosphor are applied so that the fluorescent lamp emits blue light and red light and forming a green phosphor layer by using a coating material that contains a green phosphor containing $Eu^{2+}$ or $Ce^{3+}$ as a luminescent center and has a viscosity of 4 Pa·s or more, more preferably 5 Pa·s or more and 20 Pa·s or less, in which the green phosphor layer is disposed outside the fluorescent lamp and the illuminating device emits white light as green light emitted from the green phosphor excited by the blue light mixes with the red light and the blue light.

According to the above-described method, a coating material in which the green phosphor is homogeneously dispersed and does not settle readily can be prepared even when the specific gravity and particle diameter of the green phosphor are large. Thus, an illuminating device having the green phosphor layer that can uniformly emit light can be provided. In particular, a green phosphor layer in which dispersion stability of phosphor particles is excellent, the applied layer has a more homogeneous composition and a more uniform thickness, and light can be emitted more uniformly can be prepared by an application method by adjusting the viscosity of the coating material to 5 Pa·s or more and 20 Pa·s or less.

(2) In the method of (1) above, the coating material may be applied on an outer surface of the fluorescent lamp so as to form the green phosphor layer. In this manner, an illuminating device that enables uniform illumination can be made.

(3) In the method of (1) above, the coating material may be applied on a light-diffusing plate disposed outside the fluorescent lamp so as to form the green phosphor layer. In this manner, the green phosphor layer having a homogeneous composition and a uniform thickness can be made by an application method even when the light-diffusing plate has a large area.

(4) In the method of (3) above, the coating material may be a plurality of coating materials respectively containing different types of green phosphors, and the coating materials may be applied sequentially so that green phosphor layers respectively containing different types of green phosphors are sequentially formed on the light-diffusing plate. The color purity of white light from the illuminating device can be changed by using a plurality of phosphors having different chromaticities.

(5) In the method of (1) above, a light-diffusing plate having light diffusibility may be formed by applying the coating material on a flat plate having a light-transmitting property. In this manner, the green phosphor layer can serve as a light-diffusing plate that can emit fluorescent light having substantially uniform chromaticity and luminance and that can diffuse light substantially uniformly.

(6) In the method of (5) above, the coating material may contain different types of green phosphors. In this manner, the green phosphor layer can serve as a light-diffusing plate that can emit fluorescent light having substantially uniform chromaticity and luminance and that can diffuse light substantially uniformly. Moreover, since different types of green phosphors are used, the color purity of the white light from the illuminating device can be changed.

(7) In the method of (5) above, the coating material may contain light-diffusing particles different from the green phosphor. In this manner, a light-diffusing plate having a more uniform light-diffusing effect can be provided.

(8) In the method of (7) above, the light-diffusing particles may be resin microparticles. In this manner, a light-diffusing plate having a more uniform light-diffusing effect can be provided at a lower cost.

(9) In the method of (1) above, the coating material may be prepared by dispersing the green phosphor in a solution containing an organic resin. By adjusting the mixing ratio of the organic resin to the green phosphor in preparing the coating material, the viscosity of the coating material can be adjusted within a range preferable for the type of application method employed. Thus, the green phosphor layer prepared by the application method has a homogeneous composition and a uniform thickness, and an illuminating device having the green phosphor layer that can uniformly emit light can be provided.

(10) In the method of (9) above, the organic resin may be polyurethane, polyester, urethane acrylate, an acryl monomer, or the like. In this manner, since the organic resin used has plasticity after curing, a deformable, flexible green phosphor layer can be made.

Since the luminosity of blue light and red light is small and the luminosity of green light is large, blue light and red light little affect the brightness of the afterglow when the backlight of the liquid crystal display apparatus is switched OFF although the decay time of the blue and red light is long. In contrast, green light has high luminosity and significantly contributes to the decay time. Thus, in order to notably reduce the brightness of the afterglow when the backlight is switched OFF, a green phosphor having a short decay time is used.

In an illuminating device incorporating the fluorescent lamp, blue light emitted from a cold cathode fluorescent lamp (CCFL) having a blue phosphor and a red phosphor applied onto the inner surface excites a green phosphor that is disposed outside the CCFL, has $Eu^{2+}$ or $Ce^{3+}$ as the luminescent center, and has a short decay time. Green light emitted from the green phosphor outside the CCFL mixes with blue light and red light emitted from the interior of the CCFL, and the illuminating device thereby emits white light. This can be achieved by applying a green phosphor on the outer surface of a glass tube of a CCFL, applying or kneading a green phosphor on or into a diffusion plate or an optical sheet constituting a backlight, or forming a green phosphor layer on a transparent sheet substrate so that the green phosphor layer can be used as a light-diffusing plate having fluorescent light-emitting capacity and light-diffusing capacity.

The green phosphor layer formed on a flat plate, such as a light-diffusing plate, can be prepared by applying a paste-like coating material (coating solution) prepare by mixing phosphor particles in a binder dissolved in or diluted with an organic solvent and drying the applied coating material. In order to increase the intensity of emission from the green phosphor layer, the filling ratio of fluorescent particles in the green phosphor layer is preferably increased and the light transmittance of the green phosphor layer is preferably increased.

Examples of the binder include ethyl cellulose, an ethylene-vinyl acetate copolymer, nitrocellulose, polyvinyl acetate, cellulose acetate butyrate, polyvinyl butyral, polyvinyl alcohol, urethane resins, and acrylic resins. Examples of the organic solvent include ketones such as methyl ethyl ketone, methyl isobutyl ketone, and cyclohexanone, and halogenated hydrocarbons such as methylene chloride and ethylene chloride.

Application of the coating material described above may be conducted by screen-printing, bar-coating, roll-coating, or other common techniques. The thickness of the green phosphor layer can be adjusted according to the viscosity of the coating solution, conditions of application, and other appropriate factors. The viscosity can be adequately changed according to the temperature and conditions for mixing the organic solvent, the phosphor particles, and the binder in preparing the coating material.

For example, a green phosphor layer containing $SrGa_2S_4$:Eu (average particle diameter: 12 μm, specific gravity: 5.1) as a green phosphor and formed on a light-diffusing plate is formed to have a thickness of 15 μm or more and 40 μm or less. In this green phosphor layer, the volume ratio of the green phosphor to the resin (binder) is 5 vol % or more and 20 vol % or less. Although the average particle diameter and specific gravity of $SrGa_2S_4$:Eu are large, $SrGa_2S_4$:Eu is substantially homogeneously dispersed in the layer, and the green phosphor layer has a substantially uniform thickness, high light-transmittance, good adhesion to the light-diffusing plate, and satisfactory impact and UV resistance.

Alternatively, instead of forming a green phosphor layer on a light-diffusing plate, a green phosphor layer may be formed on a transparent sheet substrate so that the green phosphor layer and the sheet substrate can be used in combination as a light-diffusing plate having fluorescent light emitting capacity and light-diffusing capacity by utilizing the light diffusibility of the green phosphor layer.

Alternatively, a green phosphor layer may be formed on a resin substrate having a releasing property and then separated from the resin substrate so that the resulting green phosphor layer can be used as a light-diffusing plate having fluorescent light-emitting capacity and the light-diffusing capacity. In such a case, an organic resin having plasticity after curing may be used as the organic resin that serves as a binder in which the green phosphor is dispersed. In this way, a light-diffusing plate constituted by a deformable, flexible green phosphor layer and having fluorescent light-emitting capacity and light-diffusing capacity can be made.

The illuminating device of one embodiment can be used in a display apparatus such as a liquid crystal television and is particularly suitable for a display apparatus such as a liquid crystal television for high-speed moving image display.

The embodiments of the present invention will now be described with reference to the drawings.

Embodiments

An illuminating device according to one embodiment has a fluorescent lamp including UV-excitable blue and red phosphors. Phosphor layers containing blue and red phosphors are formed on the inner surface of a fluorescent lamp tube, and a phosphor layer containing a green phosphor having an $Eu^{2+}$ or $Ce^{3+}$ luminescent center and a luminescent center wavelength of 500 nm to 570 nm is formed on the outer surface of the fluorescent lamp tube. Blue light emitted from the blue phosphor excites the green phosphor, and white light which is a mixture of blue light, red light, and green light is emitted from the illuminating device. Alternatively, the phosphor layer containing the green phosphor may be formed on a light-diffusing plate instead of the outer surface of the fluorescent lamp tube so that the phosphor layer containing the green phosphor is configured as a separate component from the fluorescent lamp tube.

A phosphor having a $1/10$ decay time of 0.2 msec or less is preferably used as the green phosphor so that an illuminating device that can improve the color quality of the fast moving image characteristic and a display apparatus incorporating the illuminating device can be provided. The illuminating device is suitable as a backlight of a LCD for high-speed moving image display.

Figure 1B:
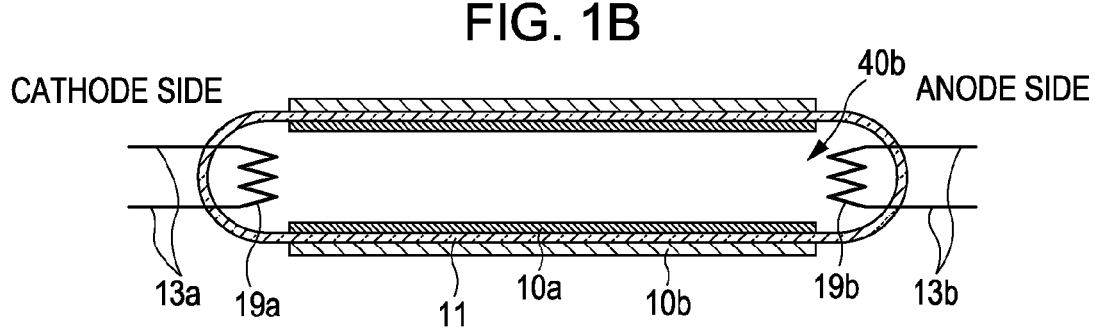
Figure 1C:
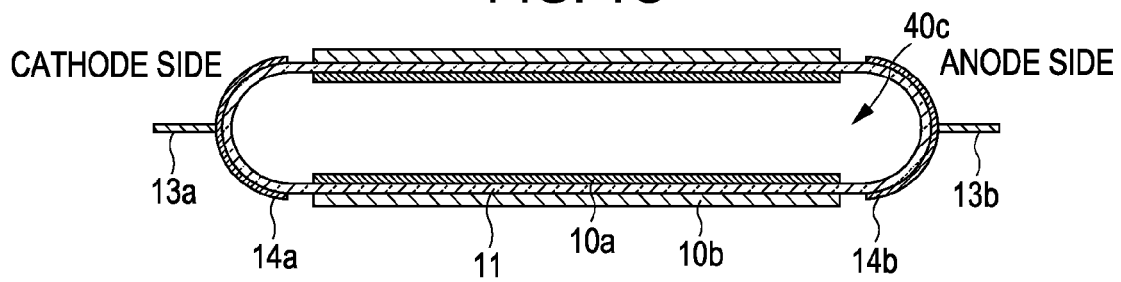
Figure 1D:
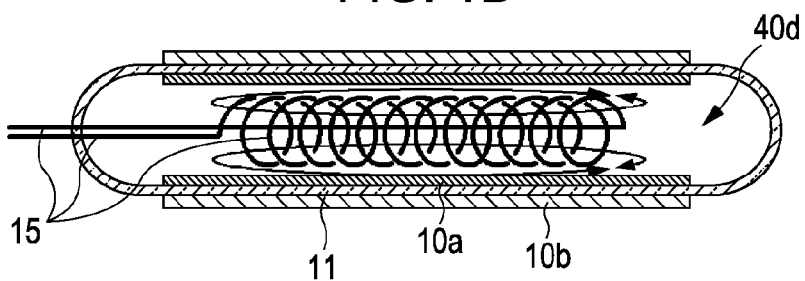

FIGS. 1A to 1D are cross-sectional views illustrating schematic structures of illuminating devices according to embodiments in which a green phosphor is disposed outside a fluorescent lamp. FIG. 1A is a schematic cross-sectional view that shows a cold cathode fluorescent lamp (CCFL) 40*a*, FIG. 1B is a schematic cross-sectional view that shows a hot cathode fluorescent lamp (HCFL) 40*b*, FIG. 1C is a schematic cross-sectional view that shows an external electrode fluorescent lamp (EEFL) 40*c*, and FIG. 1D is a schematic cross-sectional view that shows an electrodeless fluorescent lamp (internal coil type) 40*d*.

The cross-sectional views of FIGS. 1A to 1D are taken at a plane that passes through the central axis of the fluorescent lamp and extends parallel to the pipe longitudinal direction. In FIG. 1A, a cross-sectional view taken at a plane perpendicular to the central axis of the fluorescent lamp is also shown. The cross-sectional views taken at a plane perpendicular to the central axis for the fluorescent lamps shown in FIGS. 1B to 1D are omitted since they are the same as the cross-sectional view shown in FIG. 1A.

As shown in FIGS. 1A to 1D, a phosphor layer 10*a* formed by applying a mixture of a red phosphor powder and a green phosphor powder is formed on an inner wall surface of a glass tube 11 constituting the fluorescent lamp (hereinafter, this phosphor layer 10*a* is referred to as the "red-blue phosphor layer 10*a*"). A phosphor layer 10*b* formed by applying a green phosphor powder is formed on an outer wall surface of the glass tube 11 (hereinafter, this phosphor layer 10*b* is referred to as the "green phosphor layer 10*b*"). The glass tube 11 is composed of glass that absorbs and does not transmit ultraviolet. Alternatively, a blue phosphor layer containing a blue phosphor and a red phosphor layer containing a red phosphor may be stacked on the inner wall surface of the glass tube 11.

The green phosphor in the green phosphor layer 10*b* disposed on the outer wall surface of the glass tube 11 emits green light when excited by blue light emitted by exciting the blue phosphor. The illuminating device can use any type of fluorescent lamps shown in FIGS. 1A to 1D according to the purpose. Blinking of each fluorescent lamp is controlled by a desired frequency so that excitation of the red phosphor and blue phosphor by UV is controlled, red light and blue light are emitted, and green light is emitted from the green phosphor excited by the blue light. As the red light, blue light, and green light mix with each other, white light is emitted from the illuminating device.

In each of the structures shown in FIGS. 1A to 1D, the green phosphor layer 10*b* may be formed by stacking two or more types of green phosphor layers with different chromaticities, and the chromaticity point can be changed by controlling the abundance ratio (weight ratio) of the green phosphors with different chromaticities in the entire green phosphor layer 10*b*. Alternatively, a mixture of powders of two or more green phosphors having different chromaticities may be used so that the chromaticity point can be changed by adjusting the mixing ratio (weight ratio).

In the structures shown in FIGS. 1A to 1D, for example, the green phosphor layer 10*b* can be formed by applying and drying a first green phosphor in a paste form on the outer wall surface of the glass tube 11 to form a first green phosphor layer and then applying and drying a second green phosphor in a paste form on the first green phosphor layer. Alternatively, the first and second green phosphors may be mixed to form a paste and the paste may be applied and dried on the outer wall surface of the glass tube 11 to form the green phosphor layer 10*b*.

As shown in FIG. 1A, the red-blue phosphor layer 10*a* is disposed on the inner surface of the glass tube 11 of the cold cathode fluorescent lamp 40*a*, and an inert gas such as Argon is sealed in the glass tube 11 along with Hg. A cathode-side inner electrode 12*a* and an anode-side inner electrode 12*b* are respectively provided to the two end portions in the glass tube 11, and no filament electrode is provided.

In the cold cathode fluorescent lamp 40*a*, high voltage is applied from a cathode-side conductor lead 13*a* and an anode-side conductor lead 13*b* to the cathode-side inner electrode 12*a* and the anode-side inner electrode 12*b*, respectively, so that the electrons emitted from the cathode-side inner electrode 12*a* by cold emission or electrons already present in the glass tube 11 are accelerated and Ar is ionized by collision with electrons, thereby generating Ar ions and electrons. The Ar ions are accelerated toward the cathode side and collide with the cathode-side inner electrode 12*a* so that electrons are emitted from the cathode-side inner electrode 12*a*. The secondary electrons emitted are accelerated toward the anode side and ionization of Ar occurs again. As a result, an electron avalanche occurs, discharge is started, and stable discharge is maintained.

Collision of electrons with Hg excites Hg in the ground state to an excited state and Hg in the excited state emits UV in returning to the ground state. The red and blue phosphors in the red-blue phosphor layer 10*a* are irradiated with UV so that the both phosphors are excited and red fluorescent light and blue fluorescent light are generated and emitted to the outside of the glass tube 11. The blue fluorescent light emitted by excitation of the blue phosphor excites the green phosphor in the green phosphor layer 10*b* applied on the outer surface of the glass tube 11 and green fluorescent light is generated thereby. The red and blue fluorescent light generated in the glass tube 11 and the green fluorescent light generated outside the glass tube 11 are mixed to form white light.

In the structure shown in FIG. 1B, the cathode-side inner electrode 12*a* and the anode-side inner electrode 12*b* of the cold cathode fluorescent lamp 40*a* shown in FIG. 1A are respectively replaced with a cathode-side filament 19*a* and an anode-side filament 19*b*. In this HCFL 40*b*, electrical current is supplied to the cathode-side filament 19*a* to generate thermoelectrons. The thermoelectrons generated from the cathode-side filament 19a are accelerated toward the anode side by high voltage applied between the cathode-side filament 19a and the anode-side filament 19b. The accelerated thermoelectrons collide with Ar, thereby ionizing Ar, and generate Ar ions and electrons. The secondary electrons emitted are accelerated toward the anode side, collide with Hg to excite Hg, and thereby generates UV. As with the CCFL 40a, the resulting UV excites the red and blue phosphors, thereby generating red and blue fluorescent light, and the blue fluorescent light excites the green phosphor, thereby generating green fluorescent light. The fluorescent light is mixed to form white light.

Referring now to FIG. 1C, the EEFL 40c is different from CCFL or the HCFL in that no electrode is provided inside the glass tube 11. Instead, a cathode-side external electrode 14a and an anode-side external electrode 14b are respectively provided at the two outside end portions of the glass tube 11. Voltage is applied from outside of the glass tube 11 so that discharge is generated inside the glass tube 11. Argon is ionized by the discharge, and the secondary electrons emitted are accelerated toward the anode side, collide with Hg to excite Hg, and thereby generates UV. As with the CCFL 40a and the HCFL 40b, the resulting UV excites the red and blue phosphors, thereby generating red and blue fluorescent light, and the blue fluorescent light excites the green phosphor, thereby generating green fluorescent light. The fluorescent light is mixed to form white light.

Referring now to FIG. 1D, the electrodeless fluorescent lamp 40d differs from the CCFL 40 a, HCFT 40b, and the EEFL 40c in that no electrode is used for discharge and that UV is generated by exciting Hg enclosed inside with a high-frequency electromagnetic field generated from a coil 15 disposed inside or outside the glass tube 11. As with the CCFL 40a, the HCFL 40b, and the EEFL 40c, the resulting UV excites the red and blue phosphors, thereby generating red and blue fluorescent light, and the blue fluorescent light excites the green phosphor, thereby generating green fluorescent light. The fluorescent light is mixed to form white light.

It should be noted that although FIG. 1D shows an example of an internal coil type, a structure in which the coil 15 is disposed outside the glass tube 11 (external coil type) may also be employed.

In the structures shown in FIGS. 1A to 1D, since the glass tube 11 constituting each fluorescent lamp does not transmit UV, the green phosphor layer 10b disposed outside the glass tube 11 is not irradiated with UV and thus does not undergo UV degradation although the red-blue phosphor layer 10a disposed inside the glass tube 11 needs to have UV resistance. Since degradation of the green phosphor having the largest spectral luminous efficiency is suppressed, degradation in color quality of the white light can be suppressed.

Alternatively, a tube that transmits UV may be used as the glass tube 11 and the red-blue phosphor layer 10a and the green phosphor layer 10b may be disposed outside the glass tube 11. In such a case, the red-blue phosphor layer 10a is disposed on the outer wall of the glass tube 11 and then the green phosphor layer 10b is disposed on the red-blue phosphor layer 10a.

In the case where all phosphors contained in the red-blue phosphor layer 10a and the green phosphor layer 10b do not undergo degradation by UV irradiation, both red-blue phosphor layer 10a and green phosphor layer 10b can be formed inside the glass tube 11. In such a case, the green phosphor layer 10b is formed on the inner wall of the glass tube 11 and then the red-blue phosphor layer 10a is formed on the green phosphor layer 10b.

The illuminating device described with reference to FIGS. 1A to 1D can be used in a display apparatus such as a liquid crystal television and is particularly suitable for a display apparatus such as a liquid crystal television for high-speed moving image display. Moreover, the illuminating device can be naturally used as a general-purpose lighting device such as a ceiling area lighting.

Figure 2A:
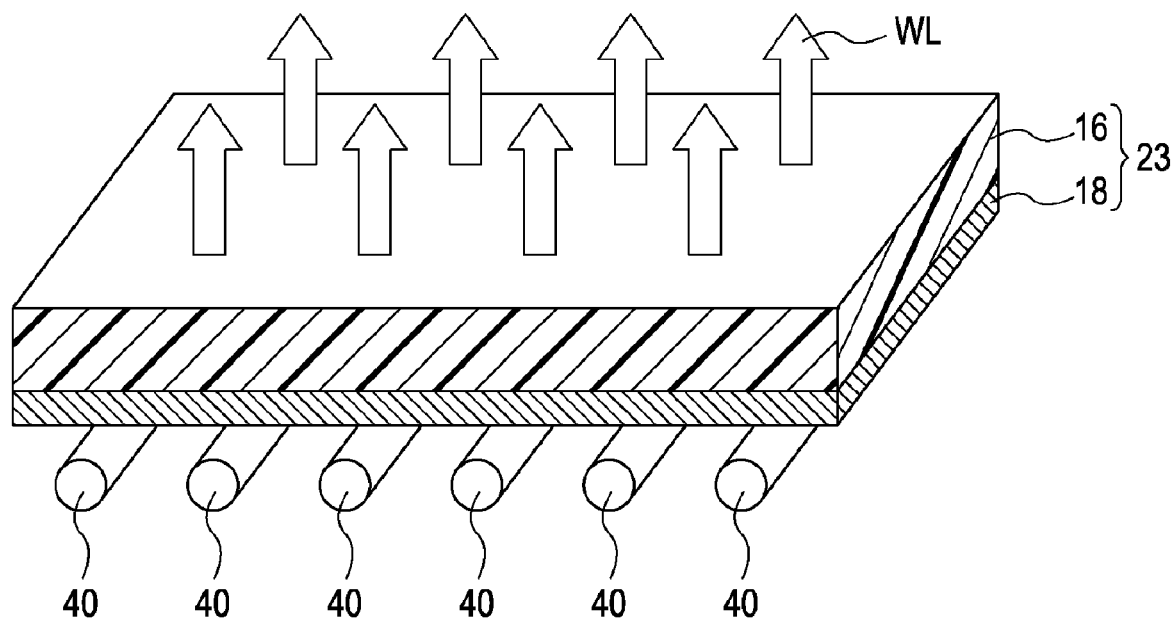
FIGS. 2A and 2B are diagrams for explaining the schematic structure of an illuminating device in which a green phosphor is disposed outside the fluorescent lamp according to another embodiment.
Figure 2B:
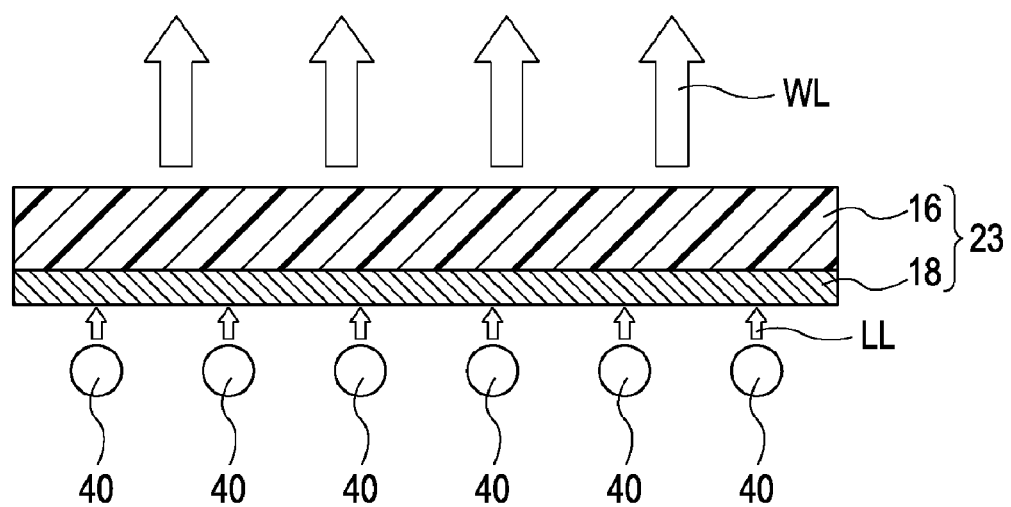

FIGS. 2A and 2B are diagrams for explaining the schematic structure of an illuminating device in which a green phosphor is disposed outside the fluorescent lamp according to another embodiment. FIG. 2A is a schematic view and FIG. 2B is a cross-sectional view.

In each of FIGS. 1A to 1D, an illumination device including a fluorescent lamp in which the green phosphor layer 10b is formed on the outer wall surface of the glass tube 11 is illustrated. In contrast, the illuminating device shown in FIGS. 2A and 2B is constituted by fluorescent lamps 40 and a diffusion layer (diffusion sheet) 23 disposed outside the fluorescent lamps 40. Unlike the structures shown in FIGS. 1A to 1D, each fluorescent lamp 40 has no green phosphor layer 10b on the outer wall surface of the glass tube 11.

The diffusion layer (diffusion sheet) 23 includes a diffusion plate (light-diffusing plate) 16 and a green phosphor layer 18 formed on a surface of the diffusion plate 16 and having substantially the same area as the diffusion plate 16. A plurality of fluorescent lamps 40 are arranged substantially in parallel to the short sides of the diffusion layer 23. Each fluorescent lamp 40 has substantially the same length as the short sides of the diffusion layer 23. Examples of the diffusion plate 16 include a frosted glass plate, a translucent resin plate, a transparent or translucent plate having a rough surface with micro asperities, a plate formed by molding a mixture of a transparent thermoplastic resin and microparticles of a silicone resin, an acrylic resin, or the like, kneaded into the transparent thermoplastic resin, and a transparent film, such as a polyethylene terephthalate (PET) film coated with a composition containing a light-transmitting resin and micro particles kneaded into the light-transmitting resin.

The diffusion layer 23 can be formed by, for example, dissolving ethyl cellulose in terpineol to prepare a binder, mixing a green phosphor powder with the binder to prepare a paste, applying the paste by a printing technique on the diffusion plate 16 to a desired thickness, and then drying the applied paste. The lamp light LL composed of blue fluorescent light and red fluorescent light emitted from the fluorescent lamps 40 enters the green phosphor layer 18, and the green phosphor excited by the blue fluorescent light emits green fluorescent light. White light obtained by mixing the blue fluorescent light, the green fluorescent light, and the red fluorescent light is diffused, uniformized, and emitted from the diffusion plate 16 as planar white light WL.

According to the structure shown in FIGS. 2A and 2B, lamp light LL from the fluorescent lamps 40 enters the green phosphor layer 18 and then the diffusion plate 16. Alternatively, the structure may be modified so that the lamp light LL enters the diffusion plate 16 first and the green phosphor layer 18 next.

As described below, a phosphor layer can be formed by stacking two or more types of green phosphor layers with different chromaticities and the chromaticity point can be changed by controlling the abundance ratio (weight ratio) of the green phosphors with different chromaticities in the entire phosphor layer. Alternatively, a mixture of powders of two or more green phosphors having different chromaticities may be used so that the chromaticity point can be changed by adjusting the mixing ratio (weight ratio).

Figure 3A:
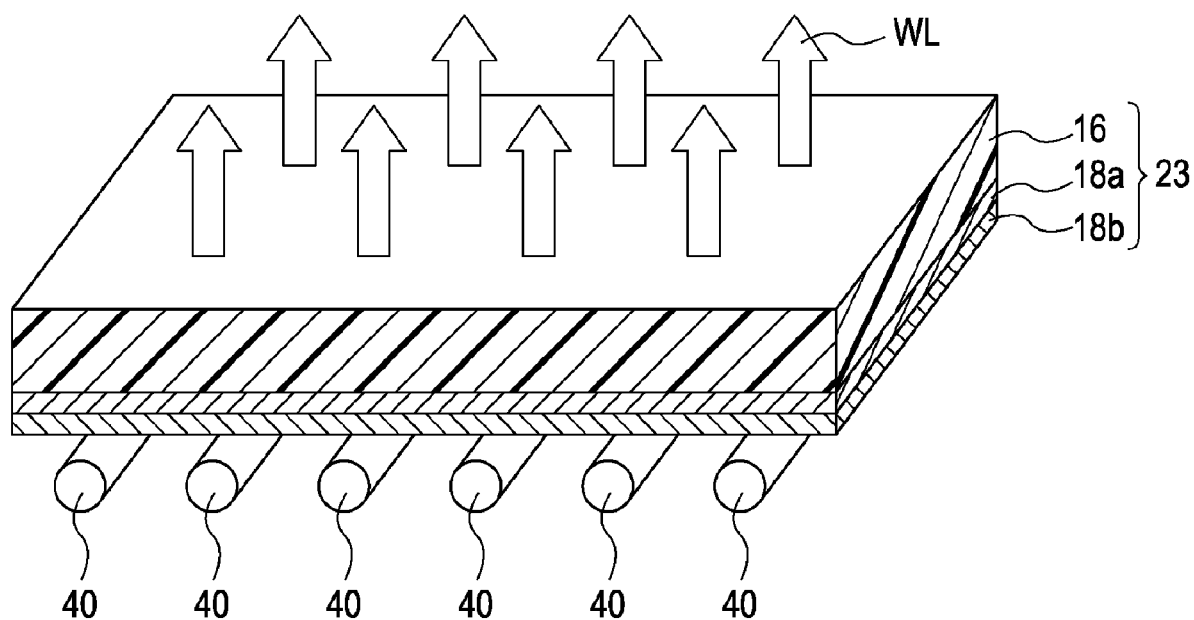
FIGS. 3A and 3B are diagrams for explaining the schematic structure of an illuminating device in which a plurality of types of green phosphors are disposed outside the fluorescent lamp according to yet another embodiment.
Figure 3B:
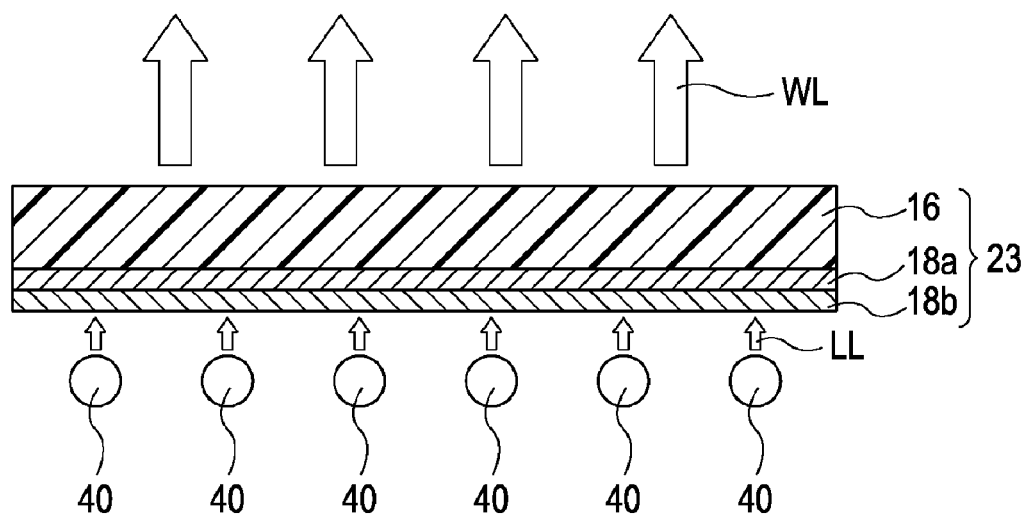

FIGS. 3A and 3B are diagrams for explaining the schematic structure of an illuminating device in which a plurality of types of green phosphors are disposed outside the fluorescent lamp according to yet another embodiment. FIG. 3A is a schematic view and FIG. 3B is a cross-sectional view.

The structure shown in FIGS. 3A and 3B is different from the structure shown in FIGS. 2A and 2B in that the diffusion layer 23 is obtained by applying and drying a first green phosphor in a paste form on the outer wall surface of the diffusion plate 16 to form a first green phosphor layer 18a and then applying and drying a second green phosphor in a paste form on the first green phosphor layer to prepare a second green phosphor layer 18b. Although not shown in drawing, the diffusion layer 23 may be formed by applying and drying a paste containing the first green phosphor and the second green phosphor on the diffusion plate 16.

According to the structure shown in FIGS. 3A and 3B, lamp light LL from the fluorescent lamps 40 enters the green phosphor layer 18b, then green phosphor layer 18a, and then the diffusion plate 16. Alternatively, the structure may be modified so that the lamp light LL enters the diffusion plate 16 first, the green phosphor layer 18a next, and the green phosphor layer 18b last.

In the structures shown in FIGS. 2A to 3B, reflector plates for reflecting the light emitted from the fluorescent lamps 40 are not depicted. Alternatively, for example, an illuminating device can be designed such that a reflector plate 22 having a plurality of reflecting faces having letter-U-shaped cross-sections may be provided below the fluorescent lamps 40 shown in FIGS. 2A to 3B. Alternatively, an illuminating device can have a structure similar to illuminating devices 2b and 2c shown in FIGS. 7 to 9.

In the structures shown in FIGS. 2A to 3B, since the glass tube 11 constituting each fluorescent lamp does not transmit UV, the green phosphor layers 18, 18a, and 18b disposed outside the glass tube 11 are not irradiated with UV and thus do not undergo UV degradation although the red-blue phosphor layer 10a disposed inside the glass tube 11 needs to have UV resistance.

The illuminating devices described with reference to FIGS. 2A to 3B can be used in a display apparatus such as a liquid crystal television and is particularly suitable for a display apparatus such as a liquid crystal television for high-speed moving image display. Moreover, the illuminating devices can be naturally used as a general-purpose lighting device such as a ceiling area lighting.

Figure 4A:
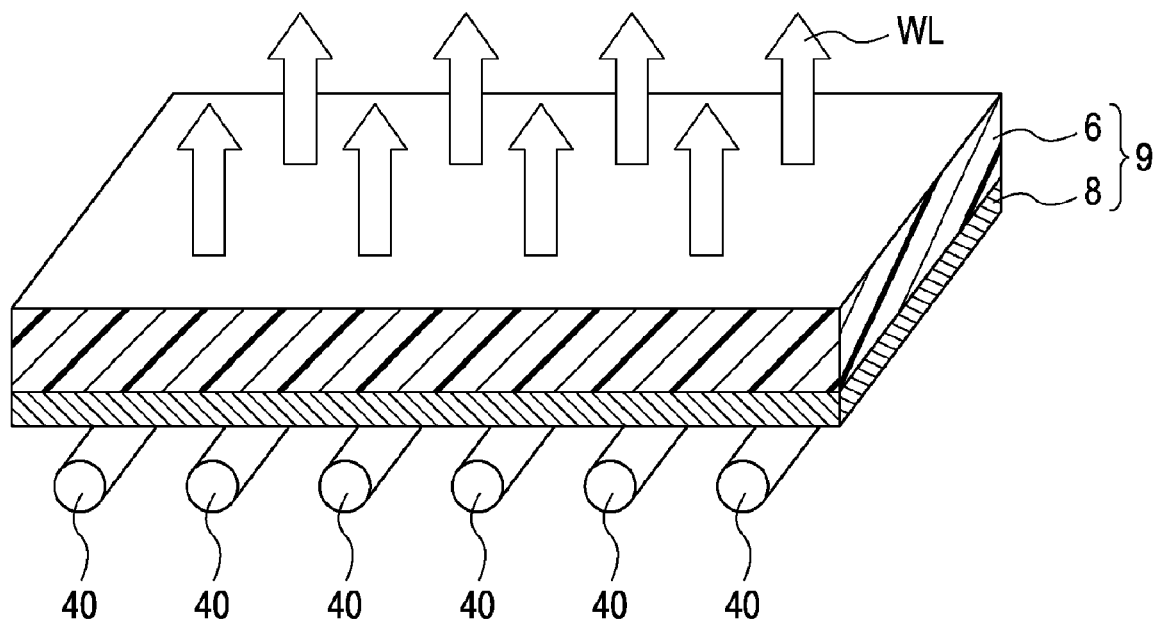
FIGS. 4A and 4B are diagrams for explaining the schematic structure of an illuminating device in which a green phosphor is disposed outside the fluorescent lamp according to another embodiment.
Figure 4B:
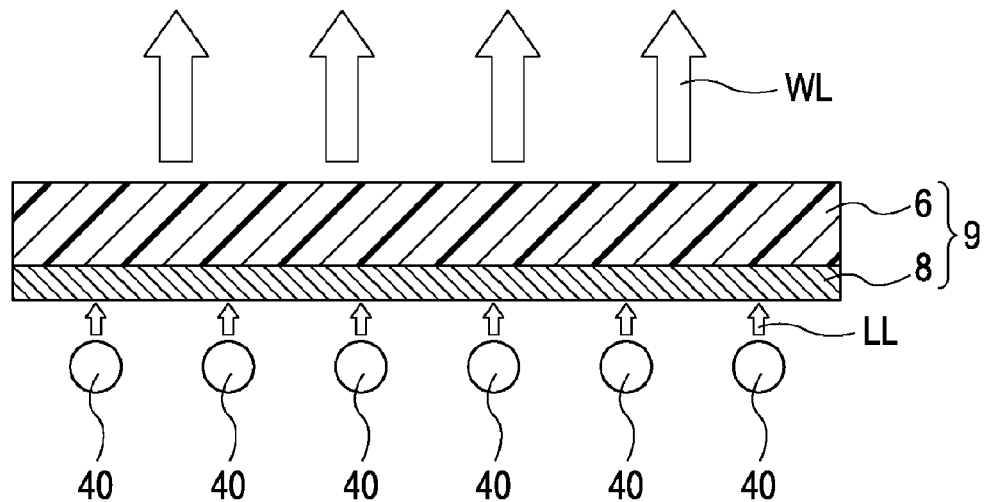

FIGS. 4A and 4B are diagrams for explaining the schematic structure of an illuminating device in which a green phosphor is disposed outside the fluorescent lamp according to another embodiment. FIG. 4A is a schematic view and FIG. 4B is a cross-sectional view.

According to the structure of the illuminating device shown in FIGS. 4A and 4B, a diffusion film (diffusion plate) 9 including a diffusion layer (light-diffusing layer) 8 containing a green phosphor and a transparent supporting member 6 supporting the diffusion layer 8 is disposed outside the fluorescent lamps 40.

Instead of the diffusion layer (diffusion sheet) 23 including the diffusion plate 16 and the green phosphor layer 18 on the diffusion plate 16 shown in FIGS. 2A and 2B, the diffusion film 9 including the transparent supporting member 6 and the green phosphor-containing diffusion layer (light-diffusing layer) 8 disposed on the transparent supporting member 6 is used in the structure shown in FIGS. 4A and 4B.

According to the structure shown in FIGS. 4A and 4B, lamp light LL from the fluorescent lamps 40 enters the green phosphor layer 8 and then the diffusion plate 6. Alternatively, the structure may be modified so that the lamp light LL enters the diffusion plate 6 first and the green phosphor layer 8 next.

A plurality of fluorescent lamps 40 are arranged substantially in parallel to the short sides of the diffusion film 9. Each fluorescent lamp 40 has substantially the same length as the short sides of the diffusion film 9. A transparent or translucent film having a rough surface with micro asperities created by inorganic or organic microparticles and a binder may be used as the diffusion layer 8 containing the green phosphor, for example.

A transparent plastic film having a high light transmittance or the like is used as the transparent supporting member 6 for use in the phosphor-containing diffusion film 9. Examples of the film include polyester, polycarbonate, polyethylene, polypropylene, triacetylcellulose, polyvinyl chloride, acryl, polystyrene, polyamide, vinylidene chloride-vinyl chloride copolymer films. Among these, polyester films are preferred for their weather resistance and processability. Although the thickness of the plastic film is not particularly limited, the thickness is usually about 10 μm to 500 μm and preferably about 20 μm to 200 μm.

The transparent binder resin, the resin particles, and the particle-shaped lubricant constituting the phosphor-containing diffusion layer (light-diffusing layer) 8 will now be described.

A resin having excellent optical transparency is used as the transparent binder resin. Examples thereof include thermoplastic resins, thermosetting resins, and ionizing radiation-curable resins such as polyester acrylate resins, polyurethane acrylate resins, epoxy acrylate resins, polyester resins, urethane-containing polyester resins, urethane resin, acrylic resins, polycarbonate resins, epoxy resins, cellulose resins, acetal resins, vinyl resins, polyethylene resins, polystyrene resins, polypropylene resins, polyamide resins, polyimide resins, melamine resins, phenolic resins, silicone resins, and fluorocarbon resins.

The resin particles are incorporated by being dispersed in the binder resin in order to impart ability to diffuse light. Examples of the resin particles include acryl, styrene, and silicone resin particles, green and red phosphor microparticles having $Eu^{2+}$ or $Ce^{3+}$ as the luminescent center, and silica-based inorganic microparticles.

There is a concern that a layer having a diffusing function may contact with another component that forms part of the display member and may damage or scratch that component. Accordingly, it is preferable not to impart light diffusibility solely by providing inorganic microparticles such as the phosphor but to design the diffusion layer to also contain organic resin particles having good flexibility.

The average particle diameter of the resin particles is 2 μm or more and preferably 4 μm or more and 40 μm or less and preferably 20 μm or less although this depends on the thickness of the light-diffusing layer. Such particles preferably have as uniform particle diameter as possible since some particles become buried in the light-diffusion layer and do not contribute to diffusion if the particle size distribution is wide. However, if all particles have the same diameter, moire patterns tend to occur. Thus, a state in which several types of particles each with a uniform particle diameter are mixed is preferred.

Moreover, it is possible to mix two or more types of green phosphor microparticles with different chromaticities so that the chromaticity point can be changed by controlling the abundance ratio (weight ratio) of the green phosphors with different chromaticities in the entire phosphor-containing diffusion layer. Alternatively, a mixture of powders of two or more green phosphors having different chromaticities may be used so that the chromaticity point can be changed by adjusting the mixing ratio (weight ratio).

The particle content is 1 wt % or more and preferably 5 wt % or more, and 500 wt % or less and preferably 300 wt % or less with respect to the binder resin. Since the particle content is 20 wt % or more, sufficient light diffusibility and the ability to convert light emitted from the fluorescent lamps into white light can be achieved simultaneously. Since the particle content is 300 wt % or less, high transparency can be maintained. Other diffusing agents may also be added as long as the above-described performance is not impaired.

The light-diffusing layer described above may contain various additives as long as the function is not impaired. Examples of such additives include a lubricant, a cross-linking agent, a coloring agent, a pigment, an antistatic agent, a flame retardant, an antibacterial agent, a fungicide, a UV absorber, a photostabilizer, an antioxidant, a plasticizer, a leveling agent, a pigment dispersant, a fluidity adjustor, and a defoaming agent.

The light-diffusing sheet of this embodiment can be fabricated by mixing the above-described transparent binder resin with phosphor-containing particles and appropriate additives or a dilution solvent appropriate for preparing a mixture, applying the mixture on at least one surface of the transparent supporting member described above by a common coating technique, such as bar coating, blade coating, spin coating, roll coating, gravure coating, flow coating, spraying, screen-printing, or the like to form a layer, heat-drying the layer, and then, if necessary, curing the dried layer by applying heat or ionizing irradiation to form a light-diffusing layer.

The ionizing irradiation may be conducted by irradiating the layer with UV in a wavelength range of 400 nm or less emitted from a ultrahigh pressure mercury lamp, a high pressure mercury lamp, a low pressure mercury lamp, a carbon arc, a metal halide lamp, or the like or with an electron beam generated by an electron beam accelerator.

The thickness of the light-diffusing layer is not particularly limited. The thickness is 2 μm to 50 μm and preferably 4 μm to 25 μm when the light-diffusing layer is formed by the coating technique.

As described above, according to these embodiments, a light-diffusing layer containing a transparent binder resin, phosphor-containing particles, and various additives is disposed on at least one surface of a transparent supporting member; thus, as the light emitted from the fluorescent lamps passes through the light-diffusion layer, white light is obtained by diffusion.

The illuminating device described with reference to FIGS. 4A and 4B can be used in a display apparatus such as a liquid crystal television and is particularly suitable for a display apparatus such as a liquid crystal television for high-speed moving image display. Moreover, the illuminating devices can be naturally used as a general-purpose lighting device such as a ceiling area lighting.

Figure 5:
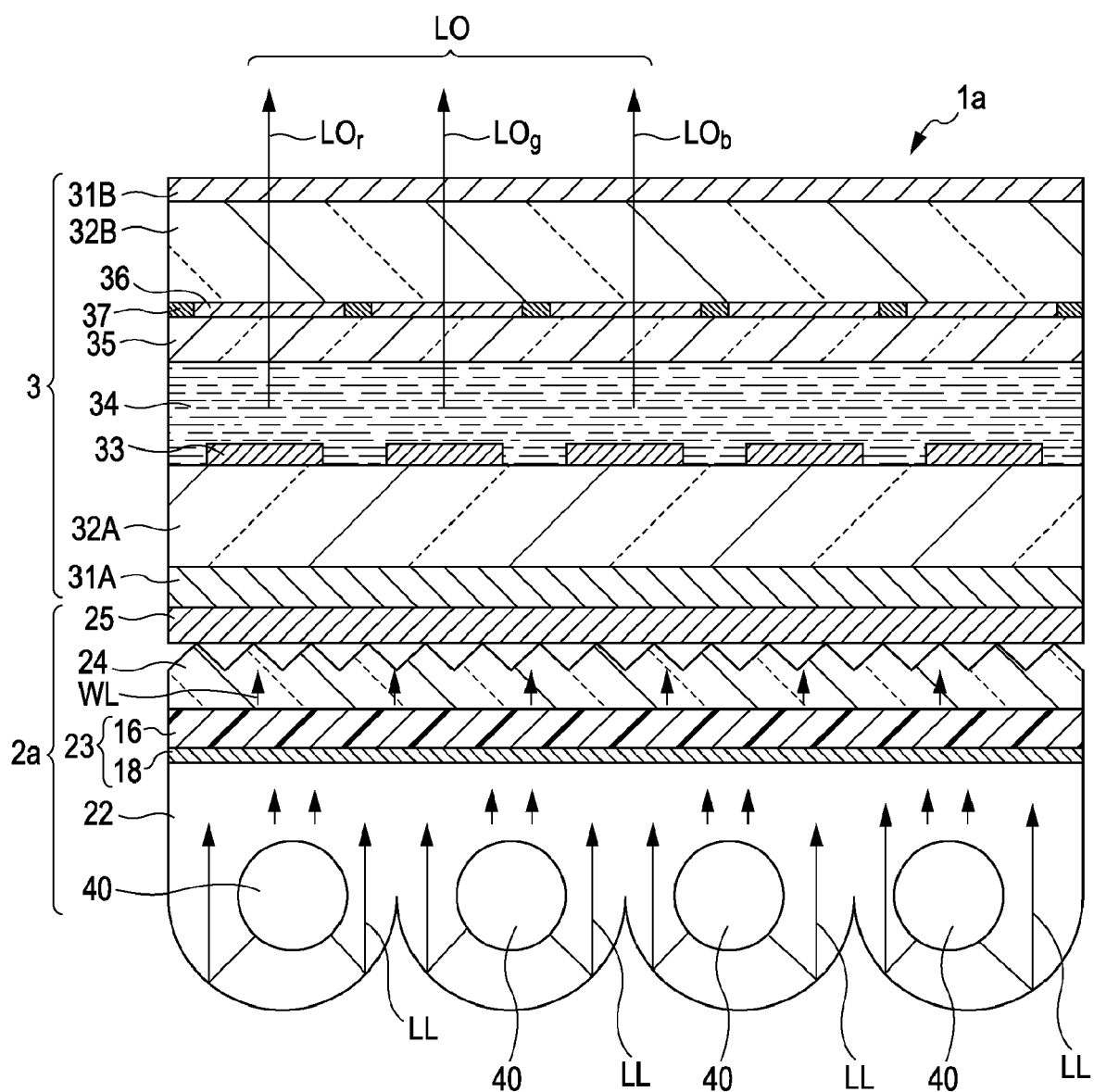
FIG. 5 is a cross-sectional view illustrating a liquid crystal display apparatus incorporating a directly below-type backlight according to another embodiment.

FIG. 5 is a cross-sectional view illustrating a liquid crystal display apparatus 1a incorporating a directly below-type backlight according to another embodiment.

As shown in FIG. 5, the liquid crystal display apparatus 1a includes a liquid crystal panel 3 and an illuminating device 2a positioned at the back of the liquid crystal panel 3 (the side opposite the image viewing side). The illuminating device 2a is disposed as the backlight directly below the back side of the liquid crystal panel 3. In other words, the liquid crystal display apparatus 1a is of a transmissive type and is configured to emit display light LO composed of red display light $LO_r$, green display light $LO_g$, and blue display light $LO_b$ by utilizing white light WL from the illuminating device 2a.

According to the structure of the illuminating device 2a shown in FIG. 5, a plurality of fluorescent lamps 40 each of which is a CCFL shown in FIG. 1A but without the green phosphor layer 10b on the outer surface of the glass tube 11 are used, and the diffusion layer 23 including the diffusion plate 16 and the green phosphor layer 18 formed on the diffusion plate 16 is disposed between the fluorescent lamps 40 and a prism sheet 24.

Alternatively, in the structure shown in FIG. 5, a diffusion sheet 25 may be omitted and the diffusion layer 23 may be disposed on the upper side of the prism sheet 24.

In the illuminating device 2a shown in FIG. 5 a plurality of fluorescent lamps 40 are arranged substantially in parallel to one side of the diffusion layer 23 (side extending in a direction perpendicular to the plane of paper sheet of FIG. 5). Each fluorescent lamp 40 is a long fluorescent lamp that has substantially the same length as that side of the diffusion layer 23. Alternatively, this long fluorescent lamp may be replaced with a plurality of short fluorescent lamps closely arranged to extend in the direction of that side.

The illuminating device 2a includes a plurality of (four according to the example shown in FIG. 5) cold cathode fluorescent lamps (CCFLs) 40 arranged parallel to each other. A reflector plate 22 is provided to surround the fluorescent lamps (CCFLs) 40 except for the liquid crystal panel 3 side. At the liquid crystal panel 3 side of the fluorescent lamps (CCFLs) 40, the diffusion layer 23 and the prism sheet 24 are provided in that order from the fluorescent lamp (CCFL) 40 side. White light WL is generated by mixing lamp light LL composed of red and blue fluorescent light generated from the red-blue phosphor layer 10a excited with UV and disposed on the inner wall surface of each fluorescent lamp (CCFL) 40 and green fluorescent light from the green phosphor layer 18 excited by the blue fluorescent light.

Note that in the structure shown in FIG. 5, the fluorescent lamps (CCFLs) 40 may be replaced with HFCLs shown in FIG. 1B, EEFLs shown in FIG. 1C, or electrodeless fluorescent lamps shown in FIG. 1D.

The reflector plate 22 is provided to reflect lamp light LL emitted from the fluorescent lamps (CCFLs) 40 toward the liquid crystal panel 3 side. The reflector plate 22 has a plurality of reflecting faces which having letter-U-shaped cross sections such as arch-shaped (e.g., semicircular) or parabolic cross-sections. The reflecting faces are composed of a material, such as Al, having a high reflectance for the lamp light LL. The reflector plate 22 helps effectively use the lamp light LL emitted from the fluorescent lamps (CCFLs) 40.

The diffusion sheets 23 and 25 diffuse the white light WL directed toward the liquid crystal panel 3 and reduce the brightness nonuniformity. The prism sheet 24 is provided to orient the direction of the white light WL.

The liquid crystal panel 3 has a layered structure including a pair of glass substrates 32A and 32B (the illuminating device 2a-side glass substrate 32A and the viewer-side glass substrate 32B) and a multilayer film interposed between the glass substrates 32A and 32B. The multilayer film includes, in order from the illuminating device 2a side, transparent pixel electrodes 33 corresponding to respective pixels, a liquid crystal layer 34, a transparent electrode 35 common to all pixels, a color filter 36 arranged to correspond to the respective pixels, and a black matrix 37 filling the gaps in the color filter 36. Polarizing plates 31A and 31B are respectively formed on surfaces of the glass substrates 31A and 32B remote from the liquid crystal layer 34.

The polarizing plates 31A and 31B are a type of optical shutter and only allow transmission of light having a particular vibration direction (polarized light). The polarizing plates 31A and 31B are arranged so that the polarization axes are different from each other by 90° so that the white light WL from the illuminating device 2a is transmitted or blocked through the liquid crystal layer 34.

The glass substrates 32A and 32B are generally transparent under visible light. Thus, the substrates 32A and 32B are not limited to glass substrates as long as they are transparent under the visible light and may be transparent resin substrates. Thin film transistors (TFTs) that function as driving elements electrically connected to the transparent pixel electrodes 33 and a driving circuit (not shown) having wiring and the like are formed on the glass substrate 32A.

The transparent pixel electrodes 33 are composed of, for example, indium tin oxide (ITO) and function as pixel electrodes for the respective pixels. The transparent electrode 35 is also composed of, for example, ITO and functions as a common counter electrode.

The liquid crystal layer 34 is composed of a liquid crystal of a twisted nematic (TN) or super twisted nematic (STN) mode, for example, and transmits or blocks the white light from the illuminating device 2a at the pixels according to the voltage applied from the driving circuit not shown in the drawing.

The black matrix 37 fills the gaps in the color filter 36 so that the white light WL from the illuminating device 2a is blocked and prevented from leaking to the viewer side of the liquid crystal panel 3.

The color filter 36 is provided to split the white light WL from the illuminating device 2a into three primary colors, red, green, and blue, and is constituted by a red color filter that selectively transmits the light component in the red wavelength region, a green color filter that selectively transmits the light component in the green wavelength region, and a blue color filter that selectively transmits the light component in the blue wavelength region.

In the liquid crystal display apparatus of this embodiment, lamp light LL from each fluorescent lamp (CCFL) 40 having blue and red phosphors applied on the inner surface is emitted toward the green phosphor layer 18 by the reflector plate 22. The green fluorescent light emitted from the green phosphor layer 18 excited by the blue fluorescent light contained in the lamp light LL combines with the red and blue fluorescent light contained in the lamp light LL and emitted toward the diffusion plate 16, thereby generating white light WL by mixing of the green, red, and blue fluorescent light. The brightness nonuniformity of the white light WL is reduced with the diffusion layer 23, and the direction of the white light WL is oriented with the prism sheet 24.

The white light WL entering the liquid crystal panel 3 is modulated by the voltage applied between the transparent pixel electrodes 33 and the transparent electrode 35 on the basis of a video signal and separated into different color components with the color filter 36 corresponding to the colors. As a result, display light LO composed of red display light $LO_r$, green display light $LO_g$, and blue display light $LO_b$ is emitted toward the viewer-side display surface of the liquid crystal panel 3, and color images are displayed.

In the display apparatus, the ON-OFF control of the voltage applied to the transparent pixel electrodes 33 constituting a pixel unit is done by the TFTs electrically connected to the transparent pixel electrodes 33. The ON-OFF operation of the voltage applied to the transparent pixel electrodes 33 is synchronized with the blinking of the fluorescent lamps 40 constituting the liquid crystal display apparatus 1a. Instead of using the above-described long fluorescent lamp as the fluorescent lamp (CCFL) 40, a plurality of short fluorescent lamps can be used and the ON-OFF of the voltage applied to the transparent pixel electrodes 33 can be synchronized with blinking of the short fluorescent lamps.

In the liquid crystal display apparatus, an image display period during which the driving element is turned ON and a black display period for inserting a black image data that turns the driving element OFF are provided for each frame. In this manner, a black image data is inserted to part of a single frame through one or a plurality of scanning lines, and, in accordance to the timing of displaying the black image, the backlight at a position corresponding to the black-inserted area (the region where the black mage data is inserted is referred to as "black-inserted area") is turned OFF while being synchronized with the shift of the black-inserted area. In the case where the voltage application is synchronized with the blinking of the short fluorescent lamps as described above, the image data may be inserted through one or some of the plurality of scanning lines.

In particular, the backlight at a position corresponding to the areas other than the black-inserted areas is turned ON and the backlight at a position corresponding to the black-inserted area is turned OFF. According to such a control, a pseudo-impulse display is realized, moving image visibility can be improved in high-speed moving image display, and the color quality of the moving image characteristic can be improved.

According to the structure shown in FIG. 5, lamp light LL from the fluorescent lamps 40 enters the green phosphor layer 18 and then the diffusion plate 16. Alternatively, the structure may be modified so that the lamp light LL enters the diffusion plate 6 first and the green phosphor layer 18 next.

The structure shown in FIG. 5 has the illuminating device 2a at the back of the liquid crystal panel 3, i.e., a direct below-type backlight. Alternatively, a guiding plate may be disposed at the back of the liquid crystal panel 3 and a plurality of fluorescent lamps may be disposed above and below the guiding plate or at right and left edges portions of the guiding plate, so that the backlight is of an edge-light type (sidelight type or guiding plate-type).

Figure 6:
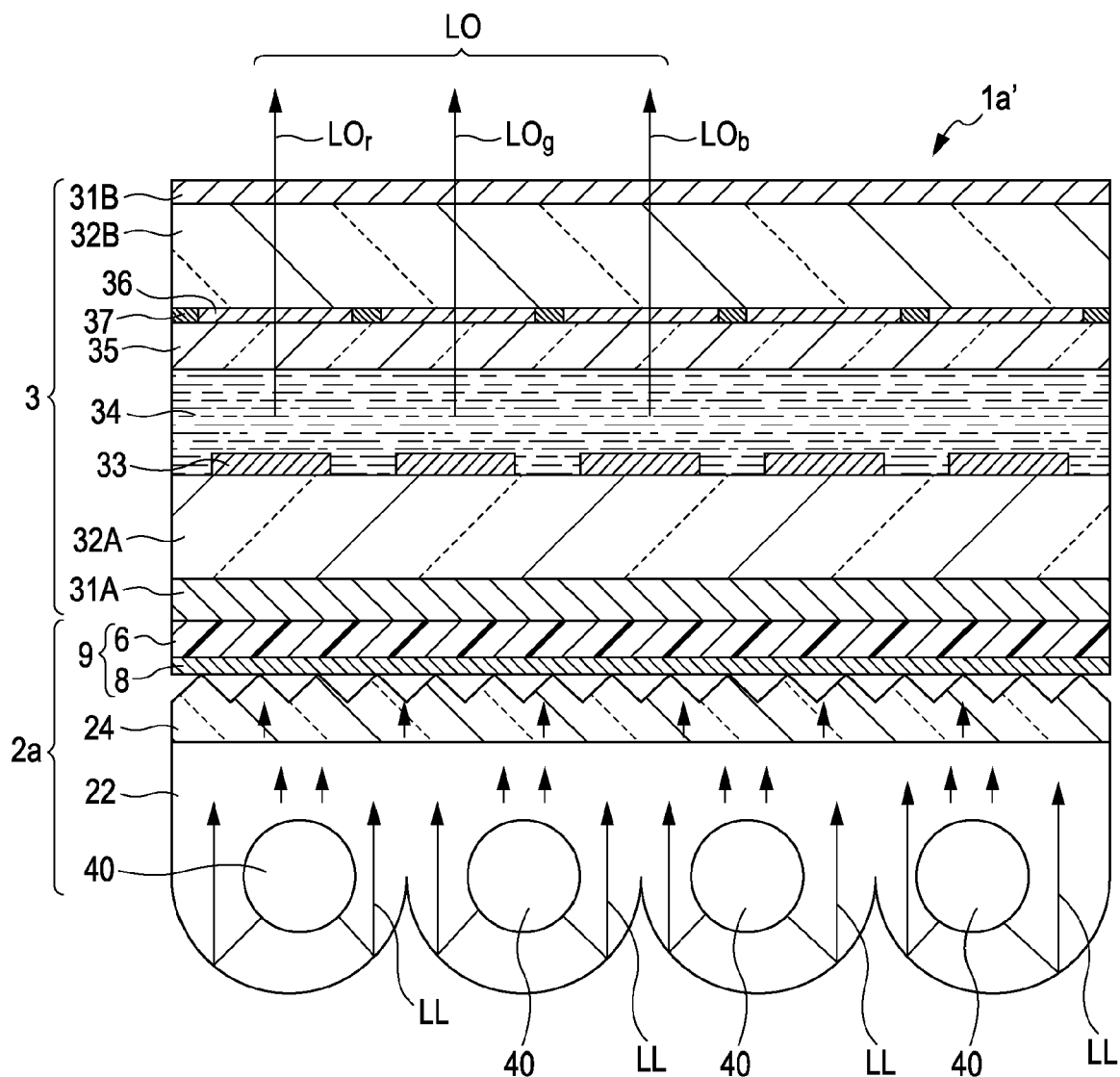
FIG. 6 is a cross-sectional view illustrating a liquid crystal display apparatus incorporating a directly below-type backlight according to another embodiment.

FIG. 6 is a cross-sectional view illustrating a liquid crystal display apparatus 1a' incorporating a directly below-type backlight according to another embodiment.

Instead of the diffusion layer (diffusion sheet) 23 including the diffusion plate 16 and the green phosphor layer 18 on the diffusion plate 16 shown in FIG. 5, the diffusion film 9 including the transparent supporting member 6 and the green phosphor-containing diffusion layer 8 disposed on the transparent supporting member 6 is used in the structure shown in FIG. 6.

As shown in FIG. 6, the liquid crystal display apparatus 1a' includes a liquid crystal panel 3 and an illuminating device 2a positioned at the back of the liquid crystal panel 3 (the side opposite the image viewing side). The illuminating device 2a is disposed as the backlight directly below the back side of the liquid crystal panel 3. In other words, the liquid crystal display apparatus 1a' is of a transmissive type and is configured to emit display light LO composed of red display light $LO_r$, green display light $LO_g$, and blue display light $LO_b$ by utilizing white light WL from the illuminating device 2a.

The illuminating device 2a shown in FIG. 6 includes a plurality of fluorescent lamps (CCFLs) 40 and the diffusion film 9 including the transparent supporting member 6 and the green phosphor-containing diffusion layer 8 disposed on the transparent supporting member 6 is interposed between the prism sheet 24 and the fluorescent lamps 40. The structure of the diffusion film 9 is the same as that shown in FIGS. 4A and 4B.

In the illuminating device 2a shown in FIG. 6 a plurality of fluorescent lamps 40 are arranged substantially in parallel to one side of the diffusion layer 8 (side extending in a direction perpendicular to the plane of paper sheet of FIG. 6). Each fluorescent lamp 40 is a long fluorescent lamp that has substantially the same length as that side of the diffusion layer 8. Alternatively, this long fluorescent lamp may be replaced with a plurality of short fluorescent lamps closely arranged to extend in the direction of that side.

The illuminating device 2a includes a plurality of (four according to the example shown in FIG. 6) cold cathode fluorescent lamps (CCFLs) 40 arranged parallel to each other. A reflector plate 22 is provided to surround the fluorescent lamps 40 except for the liquid crystal panel 3 side. At the liquid crystal panel 3 side of the fluorescent lamps (CCFLs) 40, the prism sheet 24 and the diffusion film 9 are provided in that order from the fluorescent lamp (CCFL) 40 side. White light WL is generated by mixing lamp light LL composed of red and blue fluorescent light generated from the red-blue phosphor layer 10a excited with UV and disposed on the inner wall surface of each fluorescent lamp (CCFL) 40 and green fluorescent light from the green phosphor-containing diffusion layer 8 excited with the blue fluorescent light.

Note that in the structure shown in FIG. 6, the fluorescent lamps (CCFLs) 40 may be replaced with HFCLs, EEFLs, or electrodeless fluorescent lamps.

The reflector plate 22 is provided to reflect lamp light LL emitted from the fluorescent lamps (CCFLs) 40 toward the liquid crystal panel 3 side. The reflector plate 22 has a plurality of reflecting faces which having letter-U-shaped cross sections such as arch-shaped (e.g., semicircular) or parabolic cross-sections. The reflecting faces are composed of a material, such as Al, having a high reflectance for the lamp light LL. The reflector plate 22 helps effectively use the lamp light LL emitted from the fluorescent lamps (CCFLs) 40.

The diffusion film (sheet) 9 diffuses the white light WL directed toward the liquid crystal panel 3 and reduces the brightness nonuniformity. The prism sheet 24 is provided to orient the direction of the white light WL.

The liquid crystal panel 3 has a layered structure including a pair of glass substrates 32A and 32B (the illuminating device 2a-side glass substrate 32A and the viewer-side glass substrate 32B) and a multilayer film interposed between the glass substrates 32A and 32B. The multilayer film includes, in order from the illuminating device 2a side, transparent pixel electrodes 33 corresponding to respective pixels, a liquid crystal layer 34, a transparent electrode 35 common to all pixels, a color filter 36 arranged to correspond to the respective pixels, and a black matrix 37 filling the gaps in the color filter 36. Polarizing plates 31A and 31B are respectively formed on surfaces of the glass substrates 31A and 32B remote from the liquid crystal layer 34.

The polarizing plates 31A and 31B are a type of optical shutter and only allow transmission of light having a particular vibration direction (polarized light). The polarizing plates 31A and 31B are arranged so that the polarization axes are different from each other by 90° so that the white light WL from the illuminating device 2a is transmitted or blocked through the liquid crystal layer 34.

The glass substrates 32A and 32B are generally transparent under visible light. Thus, the substrates 32A and 32B are not limited to glass substrates as long as they are transparent under the visible light and may be transparent resin substrates. Thin film transistors (TFTs) that function as driving elements electrically connected to the transparent pixel electrodes 33 and a driving circuit (not shown) having wiring and the like are formed on the glass substrate 32A.

The transparent pixel electrodes 33 are composed of, for example, indium tin oxide (ITO) and function as pixel electrodes for the respective pixels. The transparent electrode 35 is also composed of, for example, ITO and functions as a common counter electrode.

The liquid crystal layer 34 is composed of a liquid crystal of a twisted nematic (TN) or super twisted nematic (STN) mode, for example, and transmits or blocks the white light from the illuminating device 2a at the pixels according to the voltage applied from the driving circuit not shown in the drawing.

The black matrix 37 fills the gaps in the color filter 36 so that the white light WL from the illuminating device 2a is blocked and prevented from leaking to the viewer side of the liquid crystal panel 3.

The color filter 36 is provided to split the white light WL from the illuminating device 2a into three primary colors, red, green, and blue, and is constituted by a red color filter that selectively transmits the light component in the red wavelength region, a green color filter that selectively transmits the light component in the green wavelength region, and a blue color filter that selectively transmits the light component in the blue wavelength region.

In the liquid crystal display apparatus of this embodiment, lamp light LL from each fluorescent lamp (CCFL) 40 having blue and red phosphors applied on the inner surface is reflected by the reflector plate 22, the direction of the lamp light LL is oriented with the prism sheet 24, and then the lamp light LL is emitted toward the green phosphor-containing diffusion layer 8. The green fluorescent light emitted from the green phosphor contained in the diffusion layer 8 excited by the blue fluorescent light contained in the lamp light LL combines with the red and blue fluorescent light contained in the lamp light LL, thereby generating white light WL with reduced brightness nonuniformity.

The white light WL entering the liquid crystal panel 3 is modulated by the voltage applied between the transparent pixel electrodes 33 and the transparent electrode 35 on the basis of a video signal and separated into different color components with the color filter 36 corresponding to the colors. As a result, display light LO composed of red display light $LO_r$, green display light $LO_g$, and blue display light $LO_b$ is emitted toward the viewer-side display surface of the liquid crystal panel 3, and color images are displayed.

In the display apparatus, the ON-OFF of the voltage applied to the transparent pixel electrodes 33 constituting a pixel unit is controlled by the TFTs electrically connected to the transparent pixel electrodes 33. The ON-OFF operation of the voltage applied to the transparent pixel electrodes 33 is synchronized with the blinking of the fluorescent lamps 40 constituting the liquid crystal display apparatus 1a'. Instead of using the above-described long fluorescent lamp as the fluorescent lamp (CCFL) 40, a plurality of short fluorescent lamps can be used and the ON-OFF of the voltage applied to the transparent pixel electrodes 33 can be synchronized with blinking of the short fluorescent lamps.

In the liquid crystal display apparatus, an image display period during which the driving element is turned on and a black display period for inserting a black image data that turns the driving element OFF are provided frame by frame. In this manner, a black image data is inserted to part of a single frame through one or a plurality of scanning lines, and, in accordance to the timing of displaying the black image, the backlight at a position corresponding to the black-inserted area (the region where the black mage data is inserted is referred to as "black-inserted area") is turned OFF while being synchronized with the shift of the black-inserted area. In the case where the voltage application is synchronized with the blinking of the short fluorescent lamps as described above, the image data may be inserted through one or some of the plurality of scanning lines.

In particular, the backlight at a position corresponding to the areas other than the black-inserted areas is turned ON and the backlight at a position corresponding to the black-inserted area is turned OFF. According to such a control, a pseudo-impulse display is realized, moving image visibility can be improved in high-speed moving image display, and the color quality of the moving image characteristics can be improved.

According to the structure shown in FIG. 6, lamp light LL from the fluorescent lamps 40 enters the green phosphor layer 8 and then the diffusion plate 6. Alternatively, the structure may be modified so that the lamp light LL enters the diffusion plate 6 first and the green phosphor layer 8 next.

The structure shown in FIG. 6 has the illuminating device 2*a* at the back of the liquid crystal panel 3, i.e., a direct below-type backlight. Alternatively, a guiding plate may be disposed at the back of the liquid crystal panel 3 and a plurality of fluorescent lamps may be disposed above and below the guiding plate or at right and left edges portions of the guiding plate, so that the backlight is of an edge-light type (sidelight type or guiding plate-type).

Figure 7:
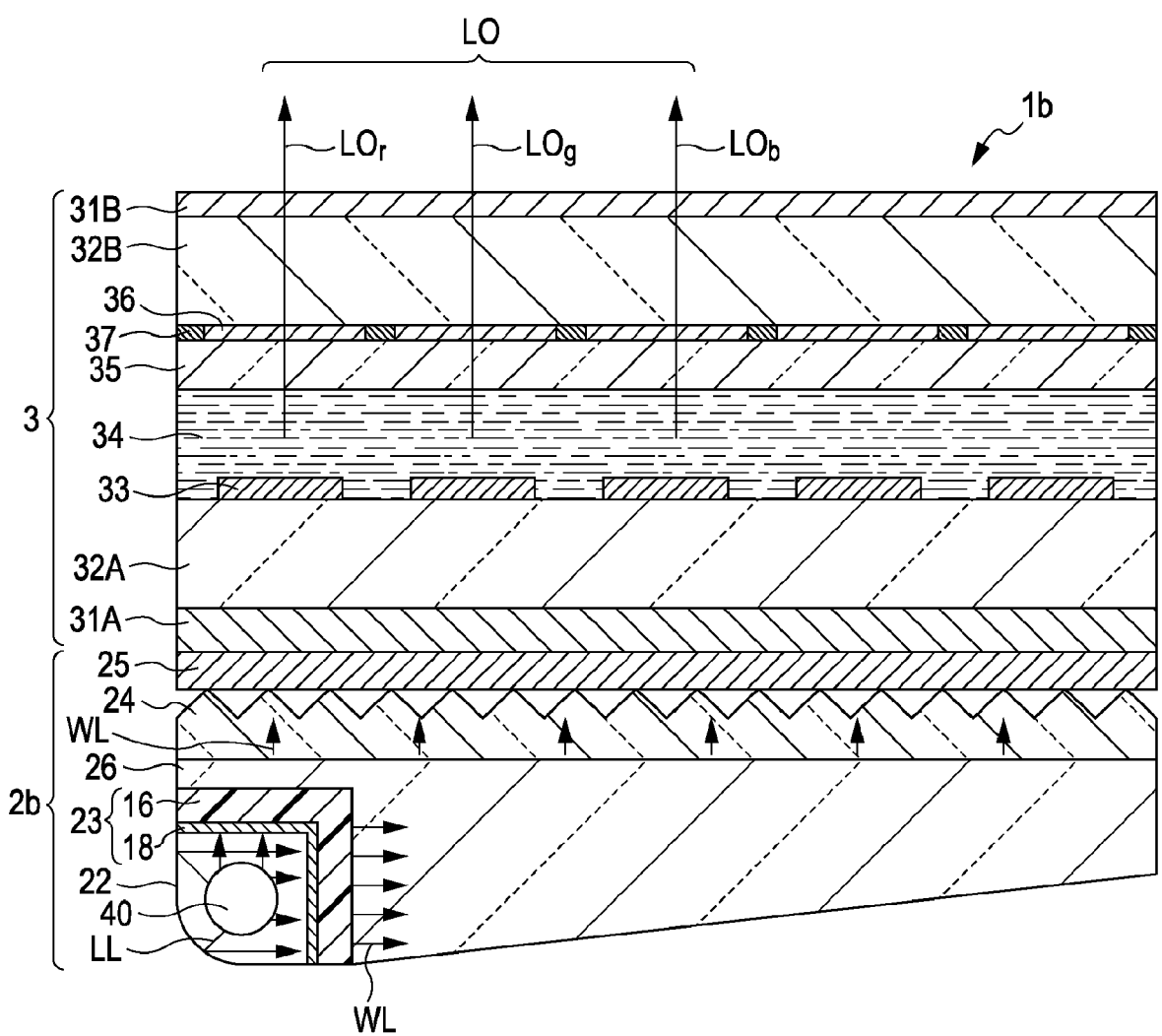
FIG. 7 is a cross-sectional view illustrating a liquid crystal display apparatus incorporating a side edge-type backlight according to another embodiment.
Figure 8:
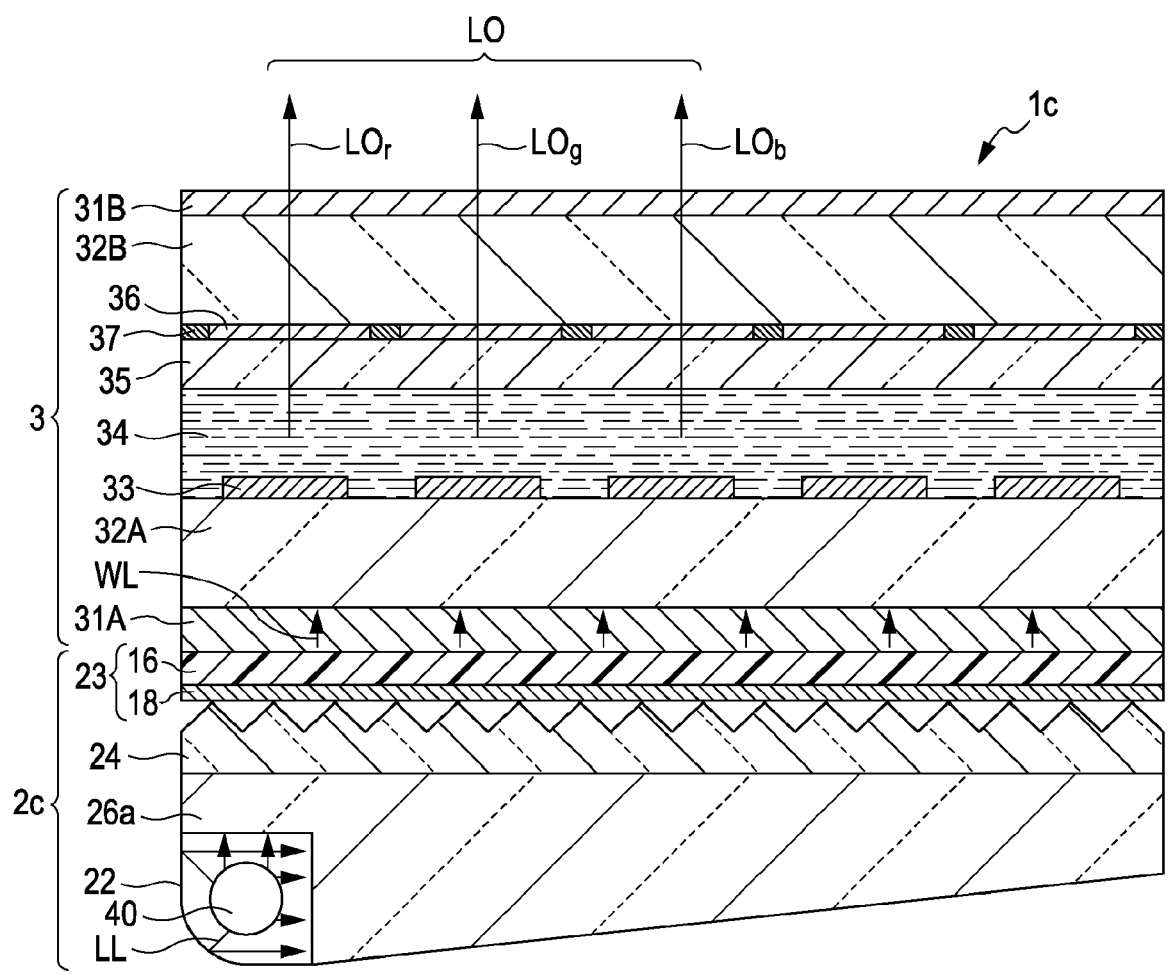
FIG. 8 is a cross-sectional view illustrating a liquid crystal display apparatus incorporating a side edge-type backlight according to another embodiment.

FIGS. 7 and 8 are cross-sectional views respectively illustrating liquid crystal display apparatuses 1*b* and 1*c* incorporating side edge-type backlights.

The structure of the liquid crystal display apparatus 1*a* shown in FIG. 5 incorporating the illuminating device 2*a* directly below the back side of the liquid crystal panel 3 may be modified so as to form a liquid crystal display apparatus 1*b* incorporating a side edge (sidelight)-type backlight in which a fluorescent lamp (CCFL) 40, which is a linear light source, is arranged along a side edge of a guiding plate 26 constituted by a transparent plate, as shown in FIG. 7. White light WL from the fluorescent lamp 40 and the diffusion layer 23 (the diffusion plate 16 and the green phosphor layer 18) is converted into planar light through the guiding plate 26 and emitted through the back of the liquid crystal panel 3. The differences of the liquid crystal display apparatus 1*b* from the liquid crystal display apparatus 1*a* shown in FIG. 5 are mainly discussed below.

According to the structure of the illuminating device 2*b* shown in FIG. 7, a fluorescent lamp 40 which is a CCFL shown in FIG. 1A but without the green phosphor layer 10*b* on the outer surface of the glass tube 11 is used, and the diffusion layer 23 including the diffusion plate 16 and the green phosphor layer 18 formed on the diffusion plate 16 is disposed between the fluorescent lamp 40 and the guiding plate 26. In this structure, white light WL passes through the diffusion layer 23 and enters the guiding plate 26.

White light WL is generated by mixing lamp light LL composed of red and blue fluorescent light generated from the red-blue phosphor layer 10*a* excited with UV and disposed on the inner wall surface of the fluorescent lamp (CCFL) 40 and green fluorescent light from the green phosphor layer 18 excited with the blue fluorescent light.

Alternatively, the structure shown in FIG. 7 may be modified so that the diffusion layer 23 (the diffusion plate 16 and the green phosphor layer 18) is provided instead of the diffusion sheet 25 shown in FIG. 7 so that the green phosphor layer 18 is disposed between the prism sheet 24 and the diffusion sheet 25 as shown in FIG. 8. In such a case, the diffusion layer 23 (the diffusion plate 16 and the green phosphor layer 18) and the guiding plate 26 shown in FIG. 7 are replaced with a guiding plate 26*a*.

In the structure shown in FIG. 8, alternatively, the green phosphor layer 18 may be disposed below the prism sheet 24 or above the guiding plate 26*a* so that the green phosphor layer 18 is placed between the prism sheet 24 and the guiding plate 26*a*.

According to the structures shown in FIGS. 7 and 8, lamp light LL from the fluorescent lamps 40 enters the green phosphor layer 18 and then the diffusion plate 16. Alternatively, the structure may be modified so that the lamp light LL enters the diffusion plate 16 first and the green phosphor layer 18 next.

Figure 9:
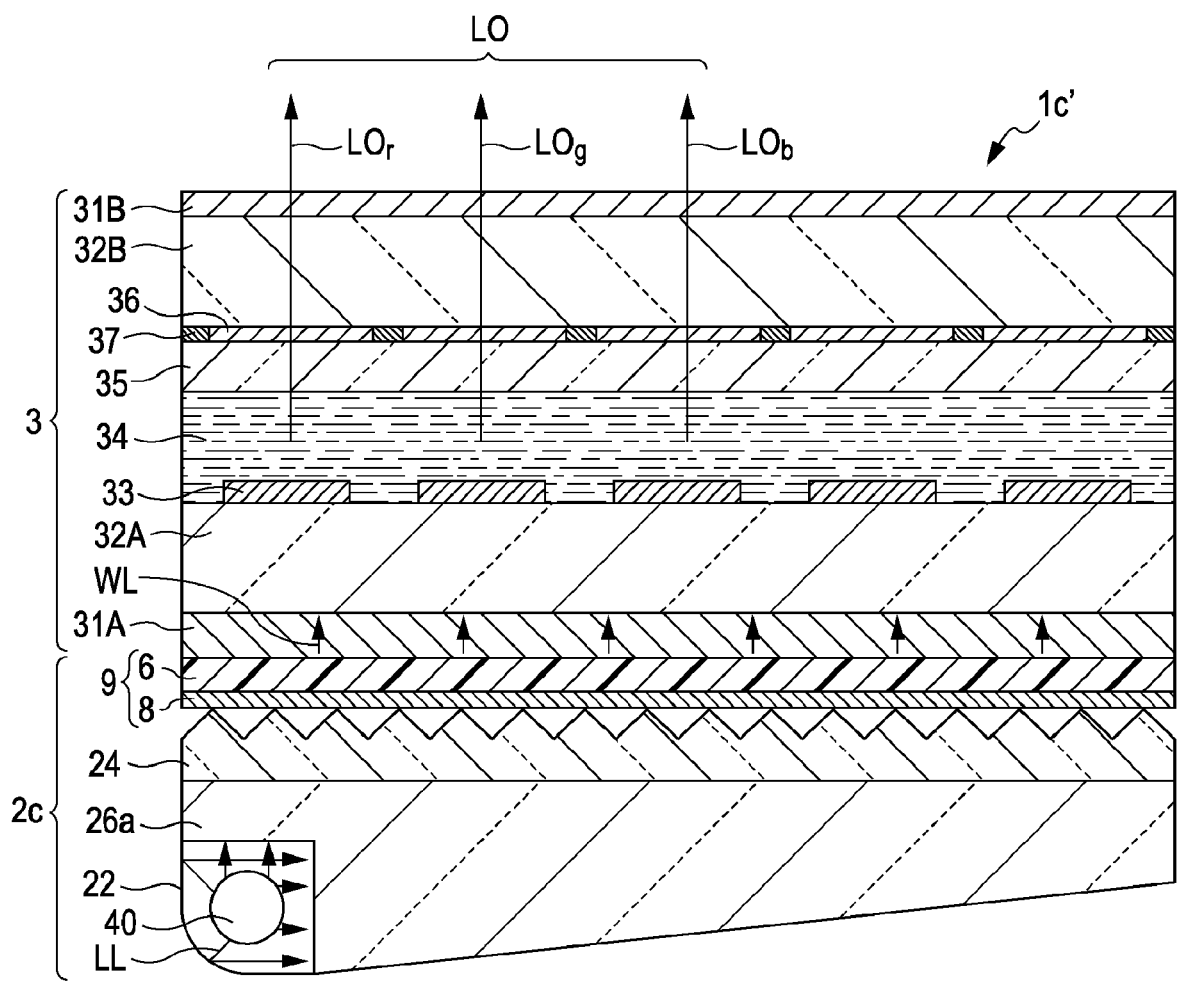
FIG. 9 is a cross-sectional view illustrating a liquid crystal display apparatus incorporating a side edge-type backlight according to another embodiment.

FIG. 9 is a cross-sectional view illustrating a liquid crystal display apparatus 1*c'* incorporating a side edge-type backlight according to another embodiment.

The structure of the liquid crystal display apparatus 1*a'* shown in FIG. 6 incorporating the illuminating device 2*a* directly below the back side of the liquid crystal panel 3 may be modified so as to form a liquid crystal display apparatus 1*c'* incorporating a side edge (sidelight)-type backlight in which a fluorescent lamp (CCFL) 40, which is a linear light source, is arranged along a side edge of a guiding plate 26*a* constituted by a transparent plate, as shown in FIG. 9.

Lamp light LL from the fluorescent lamp (CCFL) 40 is reflected by the reflector plate 22 and converted into planar light through the guiding plate 26*a*, the direction of the lamp light LL is oriented with the prism sheet 24, and then the lamp light LL is emitted toward the green phosphor-containing diffusion layer 8. The green fluorescent light emitted from the green phosphor contained in the diffusion layer 8 excited by the blue fluorescent light contained in the lamp light LL combines with the red and blue fluorescent light contained in the lamp light LL, thereby generating white light WL with reduced brightness nonuniformity.

White light WL generated by the diffusion film 9 constituted by the transparent supporting member 6 and the green phosphor-containing diffusion layer 8 on the transparent supporting member 6 is emitted through the back of the liquid crystal panel 3. The structure of the diffusion film 9 is the same as that shown in FIGS. 4A and 4B.

The structure shown in FIG. 9 may be modified so that the diffusion film 9 is disposed between the prism sheet 24 and the guiding plate 26*a*.

According to the structure shown in FIG. 9, lamp light LL from the fluorescent lamps 40 enters the green phosphor layer 8 and then the diffusion plate 6. Alternatively, the structure may be modified so that the lamp light LL enters the diffusion plate 6 first and the green phosphor layer 8 next.

Figure 10A:
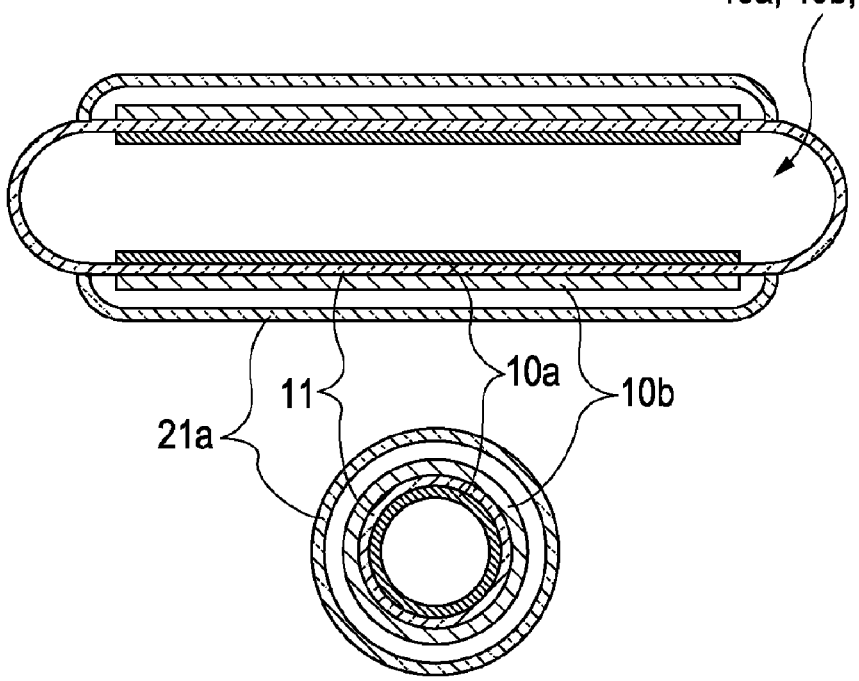
FIGS. 10A and 10B are each a cross-sectional view illustrating an illuminating device in which a green phosphor is disposed outside a fluorescent lamp according to another embodiment.
Figure 10B:
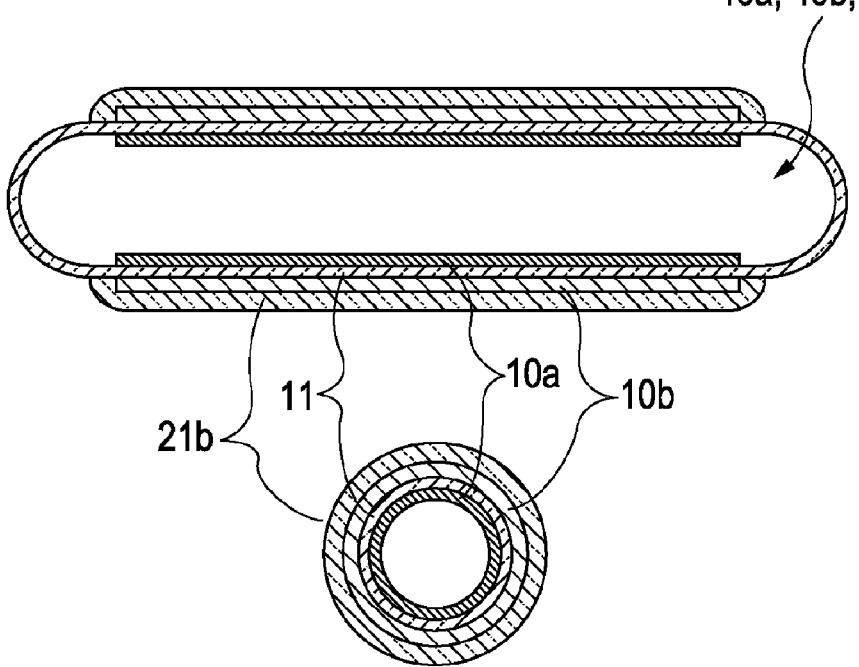
Figure 11A:
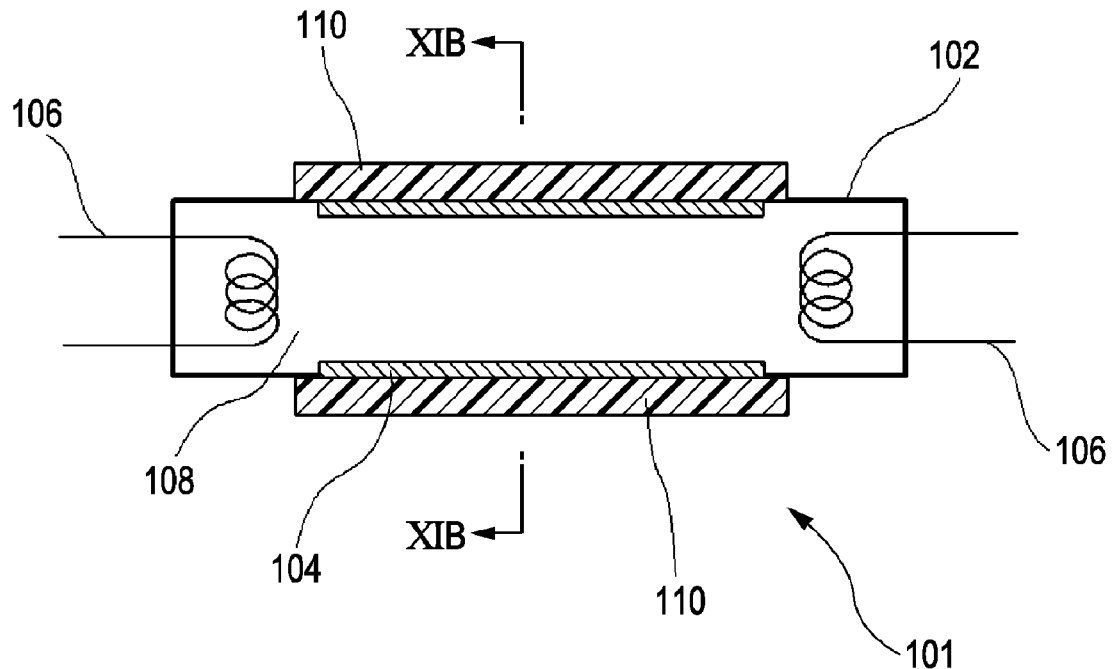
FIG. 11 is a schematic diagram showing a lamp used in a color sequential illumination system of related art.
Figure 11B:
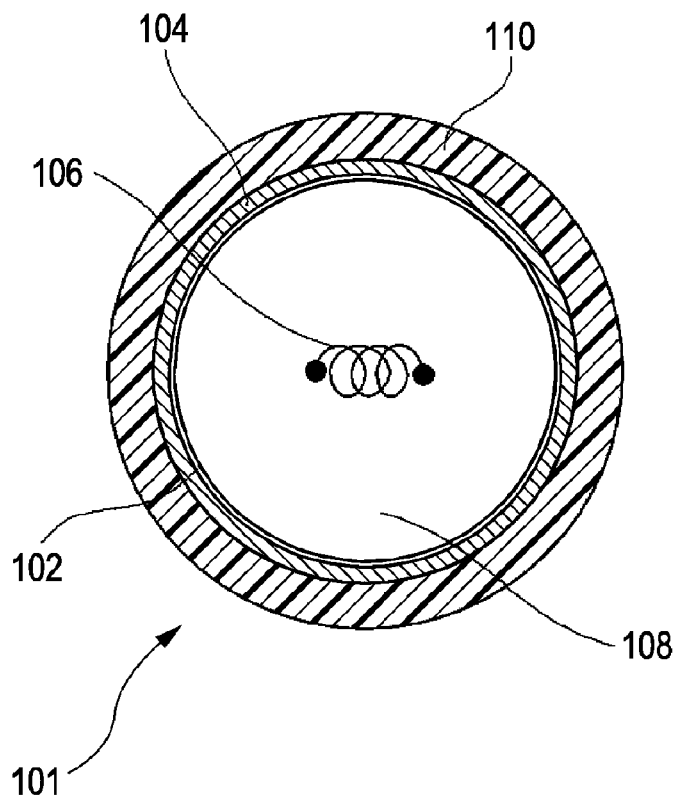
Figure 12:
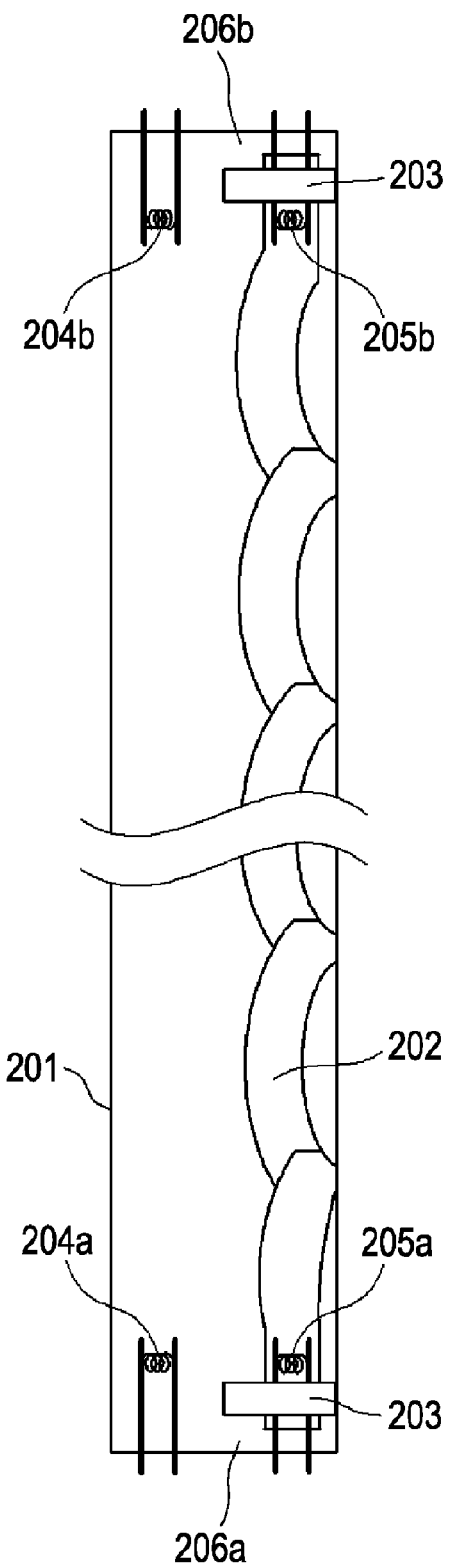
FIG. 12 is a schematic diagram of a prior art variable color fluorescent lamp.

FIGS. 10A and 10B are each a cross-sectional view illustrating an illuminating device in which a green phosphor is disposed outside a fluorescent lamp according to another embodiment. FIG. 10A is a cross-sectional view illustrating how a green phosphor layer is protected by a glass tube (outer tube). FIG. 10B is a cross-sectional view illustrating how a green phosphor layer is protected by a transparent coating film. In FIGS. 10A and 10B, only the glass tube 11, the red-blue phosphor layer 10*a*, and the green phosphor layer 10*b* are illustrated and other components of the fluorescent lamp are omitted.

In the case where a phosphor layer is formed on the outer surface of a glass tube of a fluorescent lamp, the moisture resistance and the like can be improved by employing a structure shown in FIG. 10A in which the green phosphor layer 10*b* formed on the outer surface of the glass tube 11 is hermetically covered with another glass tube (outer tube) 21*a* or a structure shown in FIG. 10B in which a transparent coating film 21*b* composed of glass or a resin having low moisture permeability is formed on the green phosphor layer 10*b* formed on the outer surface of the glass tube 11.

Naturally, the structures shown in FIGS. 10A and 10B can be employed in the cases where the blue phosphor layer and/or the red phosphor layer is formed on the outer surface of the glass tube 11 in addition to the green phosphor layer 10b. The fluorescent lamp may be any of CCFL, HCFL, EEFL, and an electrodeless fluorescent lamp.

Examples (No. 1)

An illuminating device including a diffusion layer 23 and fluorescent lamps 40 shown in FIGS. 2A and 2B was made, and the decay time of the green phosphor was evaluated as a $\frac{1}{10}$ decay time by determining the time taken for the luminance of green fluorescent light to decrease to $\frac{1}{10}$ the initial luminance from zero time, i.e., the time immediately after the excitation of the fluorescent lamp was stopped. The decay time of the green phosphor layer on the diffusion plate was measured by monitoring the intensity of the green fluorescent light immediately after AC supply of the fluorescent lamp was stopped with a pin diode through a green color filter which selectively transmitted only light in the green wavelength region, and then observing the attenuation of the green fluorescent light with an oscilloscope.

Example 1

Illuminating Device Having a Diffusion Plate Provided with a Green Phosphor ($SrGa_2S_4$:Eu) Layer and Disposed Outside a CCFL A binder was prepared by dissolving 6 g of ethyl cellulose in 300 mL of terpineol. To 20 mL of the binder, 5.0 g of a green phosphor ($SrGa_2S_4$:Eu) was added to prepare a paste, and the paste was applied on the diffusion plate 16 by printing to form a single layer.

An illuminating device including the diffusion plate and a CCFL having an inner wall on which a blue phosphor $(Sr_x, Ba_y, Ca_z, Mg_{(1-x-y-z)})_5(PO_4)_3Cl$:Eu and a red phosphor $Y_2O_3$:Eu were applied was made and used as a backlight of a liquid crystal panel. The weight ratio of the blue phosphor $(Sr_x, Ba_y, Ca_z, Mg_{(1-x-y-z)})_5(PO_4)_3Cl$:Eu to the red phosphor $Y_2O_3$:Eu that achieved a white chromaticity point near (0.300, 0.300) when the backlight installed in the liquid crystal panel was turned ON was found by trial-and-error testing, and a mixture of the blue phosphor and the red phosphor was applied on the CCFL. The trial-and-error testing was conducted using a 32-inch liquid crystal television.

An illuminating device including the CCLF on which a blue phosphor/red phosphor (73:27) mixture in accordance to the weight ratio obtained as the result of the trial-and-error testing, and a diffusion plate on which a green phosphor ($SrGa_2S_4$:Eu) was applied was made and installed in a liquid crystal panel to serve as a backlight. The white chromaticity was (0.3024, 0.3077). The backlight was removed and the decay characteristic of the green phosphor was evaluated. The $\frac{1}{10}$ decay time of the green phosphor ($SrGa_2S_4$:Eu) was about 0.2 msec.

Example 2

Illuminating Device Having a Diffusion Plate Provided with a Green Phosphor (($Sr,Ba,Ca,Mg)_2SiO_4$:Eu) Layer and Disposed Outside a CCFL The green phosphor ($SrGa_2S_4$:Eu) in EXAMPLE 1 was replaced with $(Sr,Ba,Ca,Mg)_2SiO_4$:Eu and the $\frac{1}{10}$ decay time of the green phosphor $(Sr,Ba,Ca,Mg)_2SiO_4$:Eu was evaluated.

As in EXAMPLE 1, a green phosphor $(Sr,Ba,Ca,Mg)_2SiO_4$:Eu was applied on the diffusion plate 16, and an illuminating device including this diffusion plate and a CCFL having an inner wall on which a blue phosphor $(Sr_x, Ba_y, Ca_z, Mg_{(1-x-y-z)})_5(PO_4)_3Cl$:Eu and a red phosphor $Y_2O_3$:Eu were applied was made and used as a backlight of a liquid crystal panel. The $\frac{1}{10}$ decay time of the green phosphor $(Sr,Ba,Ca,Mg)_2SiO_4$:Eu was also about 0.2 msec.

Example 3

Chromaticity of the Green Phosphor Applied on the Diffusion Plate

Green phosphors $SrGa_2S_4$:Eu and $(Sr,Ba)SiO_4$:Eu having different chromaticities were used to form green phosphor layers on diffusion plate 16, and the chromaticity of each green phosphor was determined. Since the phosphors $SrGa_2S_4$:Eu and $(Sr,Ba)SiO_4$:Eu contain $Eu^{2+}$, the decay time of the fluorescent light is short.

(1) Case of Green Phosphor $SrGa_2S_4$:Eu

A binder was prepared by dissolving 6 g of ethyl cellulose in 300 mL of terpineol. To 20 mL of the binder, 5 g of a phosphor was added to prepare a paste, and the paste was applied on the diffusion plate 16 by printing to form a single layer. The chromaticity point of the green phosphor was (0.2640, 0.6555).

(2) Case Of Green Phosphor $(Sr,Ba)SiO_4$:Eu

A binder was prepared by dissolving 6 g of ethyl cellulose in 300 mL of terpineol. To 20 mL of the binder, 6.6 g of a phosphor was added to prepare a paste, and the paste was applied on the diffusion plate 16 by printing to form a single layer. The chromaticity point of the green phosphor was (0.2740, 0.6104).

(3) Case of Using $SrGa_2S_4$:Eu and $(Sr,Ba)SiO_4$:Eu

To 20 mL of a binder, 2.5 g of a phosphor $SrGa_2S_4$:Eu was added to prepare a paste, and the paste was applied on a first diffusion plate to form one layer (10 μm in thickness). To 20 mL of a binder, 3.3 g of a phosphor $(Sr,Ba)SiO_4$:Eu was added to prepare a paste, and the paste was applied on a second diffusion plate to form one layer (10 μm in thickness).

Evaluation was conducted by superimposing the first diffusion plate and the second diffusion plate. The chromaticity of the green phosphors as a whole was (0.2690, 0.6342). The chromaticity point of the green phosphors was substantially the same as the intermediate point (0.2690, 0.6330) between the chromaticity point observed in the case of $SrGa_2S_4$:Eu and that in the case of $(Sr,Ba)SiO_4$:Eu. In other words, a chromaticity substantially equal to the intermediate point of the chromaticity points of two types of phosphors can be obtained by using two types of phosphors with different chromaticities.

To 20 mL of a binder, 2.5 g of a phosphor $SrGa_2S_4$:Eu was added to prepare a paste, and the paste was applied and cured on a diffusion plate 16 to form one layer (10 μm in thickness) to prepare a first phosphor layer 18a.

To 20 mL of a binder, 3.3 g of a phosphor $(Sr,Ba)SiO_4$:Eu was added to prepare a paste, and the paste was applied on the first phosphor layer 18a to form one layer (10 μm in thickness) and cured to prepare a second phosphor layer 18b. The chromaticity achieved by the diffusion layer 23 including the first phosphor layer 18a and the second phosphor layer 18b on the diffusion plate 16 was the same as above.

Comparative Examples (No. 1)

As comparative examples, the decay time of the green phosphor of a typical CCFL was evaluated as a $\frac{1}{10}$ decay time by determining the time taken for the luminance of green fluorescent light to decrease to 1/10 the initial luminance from zero time, i.e., the time immediately after the excitation of the fluorescent lamp was stopped. The decay time of the green phosphor of the CCFL was measured by monitoring the intensity of the green fluorescent light immediately after AC supply of the CCFL was stopped with a pin diode through a green color filter which selectively transmitted only light in the green wavelength region, and then observing the attenuation of the green fluorescent light with an oscilloscope.

Comparative Example 1

The 1/10 decay time of the green phosphor $BaMgAl_{10}O_{17}$:Eu,Mn in a CCFL having an inner surface on which a blue phosphor $(Sr_x,Ba_y,Ca_z,Mg_{(1-x-y-z)})_5(PO_4)_3Cl$:Eu, a green phosphor $BaMgAl_{10}O_{17}$:Eu,Mn, and red phosphor $Y_2O_3$:Eu were applied was 12 msec.

Comparative Example 2

The 1/10 decay time of the green phosphor $LaPO_4$:Tb in a CCFL having an inner surface on which a blue phosphor $(Sr_x,Ba_y,Ca_z,Mg_{(1-x-y-z)})_5(PO_4)_3Cl$:Eu, a green phosphor $LaPO_4$:Tb, and a red phosphor $Y_2O_3$:Eu were applied was 10 msec.

As described in COMPARATIVE EXAMPLES 1 and 2, the 1/10 decay time is as long as 12 msec or 10 msec when the luminescent center of the green phosphor is $Mn^{2+}$ or $Tb^{3+}$. However, as described in EXAMPLES 1 and 2, the 1/10 decay time is about 0.2 msec when the luminescent center of the green phosphor is $Eu^{2+}$, which is about thirtieth to fortieth of the 1/10 decay time of the COMPARATIVE EXAMPLES. Thus, the high-speed moving image characteristics can be improved.

In other words, even when the fluorescent lamp is blinked at 60 Hz to 120 Hz, there is no adverse effect caused by afterimage of the green phosphor since the decay time of the phosphor used in the fluorescent lamp is as short as about 0.2 msec. Thus, good moving image characteristics can be retained.

When a phosphor containing $Ce^{3+}$ having the same fluorescent emission mechanism as $Eu^{2+}$ is used, the 1/10 decay time can be shorted as shown by EXAMPLES above, and the high-speed moving image characteristics can be improved.

An example of the phosphor containing $Ce^{3+}$ is a phosphor having a garnet structure. For example, phosphors such as $Y_3Al_3Ga_2O_{12}$:Ce (luminescent center wavelength: 540 nm), $Y_2GdAl_3Ga_2O_{12}$:Ce (luminescent center wavelength: 555 nm), $YGd_2Al_3Ga_2O_{12}$:Ce (luminescent center wavelength: 562 nm), and $Gd_3Al_3Ga_2O_{12}$:Ce (luminescent center wavelength: 570 nm) can be used as the green phosphor.

Examples (No. 2)

The conditions of the composition and viscosity of the coating material used in forming the green phosphor layer 18 disposed on the diffusion plate 16 to form the diffusion layer 23 as shown in FIGS. 2A and 2B were investigated. The nonuniformity of the chromaticity distribution caused by the diffusion plate (phosphor sheet) was observed with naked eye.

An illuminating device including a diffusion layer 23 and fluorescent lamps 40 shown in FIGS. 2A and 2B was made, and the decay time of the green phosphor was evaluated as a 1/10 decay time by determining the time taken for the luminance of green fluorescent light to decrease to 1/10 the initial luminance from zero time, i.e., the time immediately after the excitation of the fluorescent lamp was stopped. The decay time of the green phosphor layer on the diffusion plate was measured by monitoring the intensity of the green fluorescent light immediately after AC supply of the fluorescent lamp was stopped with a pin diode through a green color filter which selectively transmitted only light in the green wavelength region, and then observing the attenuation of the green fluorescent light with an oscilloscope.

Example 1A

Illuminating Device Having a Diffusion Plate Provided with a Green Phosphor ($SrGa_2S_4$:Eu) Layer and Disposed Outside a CCFL In 3.0 g of ethyl methyl ketone, 1.5 g of a thermoplastic urethane resin (Pandex T-5265L produced by DIC Corporation) was dissolved, and 1.0 g of a green phosphor $SrGa_2S_4$:Eu was added to the solution. The resulting mixture was stirred to prepare a coating material, and the coating material was applied on a diffusion plate 16 with a bar coater. The viscosity of the coating material measured with pheosol-G3000 (produced by Pheometric Scientific) at 25° C. at a shear rate of 80 (1/sec) was 4,000 mPa·s (4 Pa·s) (in the examples and comparative examples below, the viscosity was measured in the same manner). The thickness of the applied film was 20 μm.

An illuminating device including the diffusion plate and a CCFL having an inner wall on which a blue phosphor $(Sr_x,Ba_y,Ca_z,Mg_{(1-x-y-z)})_5(PO_4)_3Cl$:Eu and a red phosphor $Y_2O_3$:Eu were applied was made and used as a backlight of a liquid crystal panel. The weight ratio of the blue phosphor $(Sr_x,Ba_y,Ca_z,Mg_{(1-x-y-z)})_5(PO_4)_3Cl$:Eu to the red phosphor $Y_2O_3$:Eu that achieved a white chromaticity point near (0.300, 0.300) when the backlight installed in the liquid crystal panel was turned ON was found by trial-and-error testing, and a mixture of the blue phosphor and the red phosphor was applied on the CCFL. The trial-and-error testing was conducted using a 32-inch liquid crystal television.

An illuminating device including the CCLF on which a blue phosphor/red phosphor (73:27) mixture in accordance to the weight ratio obtained as the result of the trial-and-error testing, and a diffusion plate on which a green phosphor ($SrGa_2S_4$:Eu) was applied was made and installed in a liquid crystal panel to serve as a backlight. The white chromaticity was (0.3024, 0.3077). The backlight was removed and the decay characteristic of the green phosphor was evaluated. The 1/10 decay time of the green phosphor ($SrGa_2S_4$:Eu) was about 0.2 msec. The nonuniformity of the chromaticity distribution caused by the diffusion plate (phosphor sheet) could not be observed with naked eye.

Example 2A

Illuminating Device Having a Diffusion Plate Provided with a Green Phosphor ($SrGa_2S_4$:Eu) Layer and Disposed Outside a CCFL In 6.6 g of cyclohexanone, 1.5 g of a thermoplastic urethane resin (Pandex T-5265H produced by DIC Corporation) was dissolved, and 0.53 g of a green phosphor $SrGa_2S_4$:Eu was added to the solution. The resulting mixture was stirred to prepare a coating material, and the coating material was applied on a diffusion plate 16 with a bar coater. The viscosity of the coating material was 20,000 mPa·s (20 Pa·s) at a shear rate of 80 (1/sec). The thickness of the applied film was 20 μm.

An illuminating device including the diffusion plate and a CCFL having an inner wall on which a blue phosphor $(Sr_x, Ba_y, Ca_z, Mg_{(1-x-y-z)})_5(PO_4)_3Cl:Eu$ and a red phosphor $Y_2O_3:Eu$ were applied was made and used as a backlight of a liquid crystal panel. The weight ratio of the blue phosphor $(Sr_x, Ba_y, Ca_z, Mg_{(1-x-y-z)})_5(PO_4)_3Cl:Eu$ to the red phosphor $Y_2O_3:Eu$ that achieved a white chromaticity point near (0.300, 0.300) when the backlight installed in the liquid crystal panel was turned ON was found by trial-and-error testing, and a mixture of the blue phosphor and the red phosphor was applied on the CCFL. The trial-and-error testing was conducted using a 32-inch liquid crystal television.

The backlight was installed in the liquid crystal panel. The white chromaticity was (0.3024, 0.3077). The backlight was removed and the decay characteristic of the green phosphor was evaluated. The 1/10 decay time of the green phosphor ($SrGa_2S_4:Eu$) was about 0.2 msec. The nonuniformity of the chromaticity distribution caused by the diffusion plate (phosphor sheet) could not be observed with naked eye.

Example 3A

Illuminating Device Having a Diffusion Plate Provided with a Green Phosphor ($SrGa_2S_4:Eu$) Layer and Disposed Outside a CCFL To 1.5 g of an acryl monomer (KAYARAD DPHA (dipentaerythritol hexaacrylate) produced by Nippon Kayaku Co., Ltd.), 1.0 g of a green phosphor $SrGa_2S_4:Eu$ was added, and the mixture was stirred to prepare a coating material. The coating material was applied on a diffusion plate with a bar coater. The viscosity of the coating material was 10,000 mPa·s (10 Pa·s) at a shear rate of 80 (1/sec). The thickness of the applied film was 20 μm.

An illuminating device including the diffusion plate and a CCFL having an inner wall on which a blue phosphor $(Sr_x, Ba_y, Ca_z, Mg_{(1-x-y-z)})_5(PO_4)_3Cl:Eu$ and a red phosphor $Y_2O_3:Eu$ were applied was made and used as a backlight of a liquid crystal panel. The weight ratio of the blue phosphor $(Sr_x, Ba_y, Ca_z, Mg_{(1-x-y-z)})_5(PO_4)_3Cl:Eu$ to the red phosphor $Y_2O_3:Eu$ that achieved a white chromaticity point near (0.300, 0.300) when the backlight installed in the liquid crystal panel was turned ON was found by trial-and-error testing, and a mixture of the blue phosphor and the red phosphor was applied on the CCFL. The trial-and-error testing was conducted using a 32-inch liquid crystal television.

The backlight was installed in the liquid crystal panel. The white chromaticity was (0.3024, 0.3077). The backlight was removed and the decay characteristic of the green phosphor was evaluated. The 1/10 decay time of the green phosphor ($SrGa_2S_4:Eu$) was about 0.2 msec. The nonuniformity of the chromaticity distribution caused by the diffusion plate (phosphor sheet) could not be observed with naked eye.

Example 4A

Illuminating Device Having a Diffusion Plate Provided with a Green Phosphor (($Sr,Ba,Ca,Mg)_2SiO_4:Eu$) Layer and Disposed Outside a CCFL The green phosphor ($SrGa_2S_4:Eu$) in EXAMPLE 1A was replaced with $(Sr,Ba,Ca,Mg)_2SiO_4:Eu$ and the 1/10 decay time of the green phosphor $(Sr,Ba,Ca,Mg)_2SiO_4:Eu$ was evaluated.

As in EXAMPLE 1A, a coating material containing a green phosphor $(Sr,Ba,Ca,Mg)_2SiO_4:Eu$ was applied on a diffusion plate, and an illuminating device including this diffusion plate and a CCFL having an inner wall on which a blue phosphor $(Sr_x, Ba_y, Ca_z, Mg_{(1-x-y-z)})_5(PO_4)_3Cl:Eu$ and a red phosphor $Y_2O_3:Eu$ were applied was made and used as a backlight of a liquid crystal panel. The 1/10 decay time of the green phosphor $(Sr,Ba,Ca,Mg)_2SiO_4:Eu$ was also about 0.2 msec.

As in EXAMPLE 2A, a coating material containing a green phosphor $(Sr,Ba,Ca,Mg)_2SiO_4:Eu$ was applied on a diffusion plate 16, and an illuminating device including this diffusion plate and a CCFL having an inner wall on which a blue phosphor $(Sr_x, Ba_y, Ca_z, Mg_{(1-x-y-z)})_5(PO_4)_3Cl:Eu$ and a red phosphor $Y_2O_3:Eu$ were applied was made and used as a backlight of a liquid crystal panel. The 1/10 decay time of the green phosphor $(Sr,Ba,Ca,Mg)_2SiO_4:Eu$ was also about 0.2 msec.

Example 5A

Chromaticity of the Green Phosphor Applied on the Diffusion Plate

A coating material containing green phosphors $SrGa_2S_4:Eu$ and $(Sr,Ba)SiO_4:Eu$ having different chromaticities was used to form a green phosphor layer on a diffusion plate 16, and the chromaticity of the green phosphor was determined. Since the phosphors $SrGa_2S_4:Eu$ and $(Sr,Ba)SiO_4:Eu$ contain $Eu^{2+}$, the decay time of the fluorescent light is short.

(1) Case of Green Phosphor $SrGa_2S_4:Eu$

In 3.0 g of ethyl methyl ketone, 1.5 g of a urethane resin (Pandex T-5265L produced by DIC Corporation) was dissolved, and 1.0 g of a green phosphor $SrGa_2S_4:Eu$ was added to the solution. The resulting mixture was stirred to prepare a coating material, and the coating material was applied on a diffusion plate 16 with a bar coater. The viscosity of the coating material was 4,010 mPa·s (4.01 Pa·s) at a shear rate of 80 (1/sec). The thickness of the applied film was 20 μm. The chromaticity point of the green phosphor was (0.2640, 0.6555).

(2) Case of Green Phosphor $(Sr,Ba)SiO_4:Eu$

In 3.0 g of ethyl methyl ketone, 1.5 g of a urethane resin (Pandex T-5265L produced by DIC Corporation) was dissolved, and 1.3 g of a green phosphor $SrGa_2S_4:Eu$ was added to the solution. The resulting mixture was stirred to prepare a coating material, and the coating material was applied on a diffusion plate 16 with a bar coater. The viscosity of the coating material was 4,005 mPa·s (4.005 Pa·s) at a shear rate of 80 (1/sec). The thickness of the applied film was 21 μm. The chromaticity point of the green phosphor was (0.2740, 0.6104).

(3) Case of Using $SrGa_2S_4:Eu$ and $(Sr,Ba)SiO_4:Eu$

In 3.0 g of ethyl methyl ketone, 1.5 g of a urethane resin (Pandex T-5265L produced by DIC Corporation) was dissolved, and 0.5 g of a phosphor $SrGa_2S_4:Eu$ was added to the solution to prepare a coating material. The coating material was applied on a first diffusion plate with a bar coater (thickness 20 μm). In 3.0 g of ethyl methyl ketone, 1.5 g of a urethane resin (Pandex T-5265L produced by DIC Corporation) was dissolved, and 0.7 g of a phosphor $(Sr,Ba)SiO_4:Eu$ was added to the solution to prepare a coating material. The coating material was applied on a second diffusion plate with a bar coater (thickness 20 μm).

Evaluation was conducted by superimposing the first diffusion plate and the second diffusion plate. The chromaticity of the green phosphors as a whole was (0.2690, 0.6342). The chromaticity point of the green phosphors was substantially the same as the intermediate point (0.2690, 0.6330) between the chromaticity point observed in the case of $SrGa_2S_4$:Eu and that in the case of $(Sr,Ba)SiO_4$:Eu. In other words, a chromaticity substantially equal to the intermediate point of the chromaticity points of two types of phosphors can be obtained by using two types of phosphors with different chromaticities.

In 3.0 g of ethyl methyl ketone, 1.5 g of a urethane resin (Pandex T-5265L produced by DIC Corporation) was dissolved, and 0.5 g of a phosphor $SrGa_2S_4$:Eu was added to the solution to prepare a coating material. The coating material was applied on a diffusion plate 16 with a bar coater (thickness 20 μm) and cured to prepare a first phosphor layer 18a. In 3.0 g of ethyl methyl ketone, 1.5 g of a urethane resin (Pandex T-5265L produced by DIC Corporation) was dissolved, and 0.7 g of a phosphor $(Sr,Ba)SiO_4$:Eu was added to the solution to prepare a coating material. The coating material was applied on the first phosphor layer 18a with a bar coater (thickness 20 μm) and cured to prepare a second phosphor layer 18b. The chromaticity achieved by the diffusion layer 23 including the first phosphor layer 18a and the second phosphor layer 18b on the diffusion plate 16 was the same as above.

Comparative Examples (No. 2)

As comparative examples, the decay time of the green phosphor of a typical CCFL was evaluated as a $1/10$ decay time by determining the time taken for the luminance of green fluorescent light to decrease to $1/10$ the initial luminance from zero time, i.e., the time immediately after the excitation of the fluorescent lamp was stopped. The decay time of the green phosphor of the CCFL was measured by monitoring the intensity of the green fluorescent light immediately after AC supply of the CCFL was stopped with a pin diode through a green color filter which selectively transmitted only light in the green wavelength region, and then observing the attenuation of the green fluorescent light with an oscilloscope. The non-uniformity of the chromaticity distribution caused by the diffusion plate (phosphor sheet) was observed with naked eye.

Comparative Example 1A

In 5.0 g of ethyl methyl ketone, 1.5 g of a urethane resin (Pandex L produced by DIC Corporation) was dissolved, and 1.0 g of a green phosphor $SrGa_2S_4$:Eu was added to the solution. The resulting mixture was stirred to prepare a coating material, and the coating material was applied on a diffusion plate with a bar coater. The viscosity of the coating material was 3,500 mPa·s (3.5 Pa·s) at a shear rate of 80 (1/sec). The thickness of the applied film was 20 μm. The backlight incorporating this diffusion plate was installed in a liquid crystal panel. Observation confirmed that the chromaticity was partially changed.

Comparative Example 1B

In 3.0 g of cyclohexanone, 1.5 g of a urethane resin (Pandex L produced by DIC Corporation) was dissolved, and 1.0 g of a green phosphor $SrGa_2S_4$:Eu was added to the solution. The resulting mixture was stirred to prepare a coating material. The viscosity of the coating material was 28,000 mPa·s (28 Pa·s) at a shear rate of 80 (1/sec). An attempt was made to apply this coating material onto a diffusion plate with a bar coater but failed because the coating material could not be spread.

Comparative Example 1C

The $1/10$ decay time of the green phosphor $BaMgAl_{10}O_{17}$:Eu,Mn in a CCFL having an inner surface on which a coating material containing a blue phosphor $(Sr_x,Ba_y,Ca_z,Mg_{(1-x-y-z)})_5(PO_4)_3Cl$:Eu, a green phosphor $BaMgAl_{10}O_{17}$:Eu,Mn, and red phosphor $Y_2O_3$:Eu was applied was 12 msec.

Comparative Example 1D

The $1/10$ decay time of the green phosphor $LaPO_4$:Tb in a CCFL having an inner surface on which a blue phosphor $(Sr_x,Ba_y,Ca_z,Mg_{(1-x-y-z)})_5(PO_4)_3Cl$:Eu, a green phosphor $LaPO_4$:Tb, and a red phosphor $Y_2O_3$:Eu were applied was 10 msec.

As described in COMPARATIVE EXAMPLES 1C and 1D, the $1/10$ decay time is as long as 12 msec or 10 msec when the luminescent center of the green phosphor is $Mn^{2+}$ or $Tb^{3+}$. However, as described in EXAMPLES 1A and 2A, the $1/10$ decay time is about 0.2 msec when the luminescent center of the green phosphor is $Eu^{2+}$, which is about thirtieth to fortieth of the $1/10$ decay time of the COMPARATIVE EXAMPLES. Thus, the high-speed moving image characteristics can be improved.

In other words, even when the fluorescent lamp is blinked at 60 Hz to 120 Hz, there is no adverse effect caused by afterimage of the green phosphor since the decay time of the phosphor used in the fluorescent lamp is as short as about 0.2 msec. Thus, good moving image characteristics can be retained.

When a phosphor containing $Ce^{3+}$ having the same fluorescent emission mechanism as $Eu^{2+}$ is used, the $1/10$ decay time can be shorted as shown by EXAMPLES above, and the high-speed moving image characteristics can be improved.

An example of the phosphor containing $Ce^{3+}$ is a phosphor having a garnet structure. For example, phosphors such as $Y_3Al_3Ga_2O_{12}$:Ce (luminescent center wavelength: 540 nm), $Y_2GdAl_3Ga_2O_{12}$:Ce (luminescent center wavelength: 555 nm), $YGd_2Al_3Ga_2O_{12}$:Ce (luminescent center wavelength: 562 nm), and $Gd_3Al_3Ga_2O_{12}$:Ce (luminescent center wavelength: 570 nm) can be used as the green phosphor.

It should noted here that the diffusion plates 16 in EXAMPLES NO. 1 and EXAMPLES NO. 2 described above are each formed by applying a coating material in which acryl resin particles, i.e., a light-diffusing agent, are dispersed in a transparent polyurethane resin, on a PET film 188 μm in thickness to form a layer having a thickness of about 30 μm and curing the layer.

Examples (No. 3)

An illuminating device including a fluorescent lamp 40 and a diffusion film 9 (shown in FIG. 4) constituted by a transparent supporting member 6 and a green phosphor-containing diffusion layer 8 disposed on the transparent supporting member 6 was made, and the decay time of the green phosphor was evaluated as a $1/10$ decay time by determining the time taken for the luminance of green fluorescent light to decrease to $1/10$ the initial luminance from zero time, i.e., the time immediately after the excitation of the fluorescent lamp was stopped. The decay time of the green phosphor layer on the diffusion film 9 was measured by monitoring the intensity of the green fluorescent light immediately after AC supply of the fluorescent lamp was stopped with a pin diode through a green color filter which selectively transmitted only light in the green wavelength region, and then observing the attenuation of the green fluorescent light with an oscilloscope.

Example 1B

Illuminating Device Having a Diffusion Film Disposed Outside a CCFL and Provided with a Light-Diffusing Layer Containing a Green Phosphor ($SrGa_2S_4$:Eu)

A coating material containing components (a) to (e) below and green phosphor ($SrGa_2S_4$:Eu) microparticles was prepared, applied on a transparent supporting member 6, and dried to form a diffusion layer 8 so as to prepare a diffusion film 9.

| | |
|---|---|
| (a) Green phosphor microparticles: $SrGa_2S_4$:Eu | 15 wt % |
| (b) Diffusing particles: PMMA particles (8 μm dia.) | 38 wt % |
| (c) Binder: Unidic V4263 (produced by Dainippon Ink and Chemicals, Inc.) | 37 wt % |
| (d) Photoinitiator: Darocur 1173 | 0.6 wt % |
| (e) Solvent: methyl ethyl ketone | 9.4 wt % |

Components (a) to (e) were mixed with a stirrer (HM-800 produced by Keyence Corporation) for 1 minute to prepare a coating material. The coating material was applied on a PET substrate (transparent supporting member 6) (A4300 produced by Toyobo Co., Ltd., 188 μm in thickness) with a bar coater. The applied material was dried for 2 minutes at 80° C. and cured by applying an energy of 1000 mJ/cm$^2$ to prepare a diffusion film 9. The thickness of the applied film was 25 μm.

The Unidic V4263 (produced by Dainippon Ink and Chemicals, Inc.) is a urethane acrylate and is a UV-curable resin whose reaction is accelerated with an alkyl phenone photoinitiator, e.g., Darocur 1173 (produced by Ciba Specialty Chemicals Inc.).

Technopolymer (produced by Sekisui Plastics Co., Ltd.) may be used as the PMMA particles used as the diffusing particles.

An illuminating device including the diffusion film and a CCFL having an inner wall on which a blue phosphor ($Sr_x$, $Ba_y$, $Ca_z$, $Mg_{(1-x-y-z)}$)$_5$(PO$_4$)$_3$Cl:Eu and a red phosphor Y$_2$O$_3$:Eu were applied was made and used as a backlight of a liquid crystal panel. The weight ratio of the blue phosphor ($Sr_x$, $Ba_y$, $Ca_z$, $Mg_{(1-x-y-z)}$)$_5$(PO$_4$)$_3$Cl:Eu to the red phosphor Y$_2$O$_3$:Eu that achieved a white chromaticity point near (0.300, 0.300) when the backlight installed in the liquid crystal panel was turned ON was found by trial-and-error testing, and a mixture of the blue phosphor and the red phosphor was applied on the CCFL. The trial-and-error testing was conducted using a 32-inch liquid crystal television.

An illuminating device including the CCLF on which a blue phosphor/red phosphor (73:27) mixture in accordance to the weight ratio obtained as the result of the trial-and-error testing, and a diffusion plate on which a green phosphor ($SrGa_2S_4$:Eu) was applied was made and installed in a liquid crystal panel to serve as a backlight. The white chromaticity was (0.3024, 0.3077). The backlight was removed and the decay characteristic of the green phosphor was evaluated. The $^1\!/_{10}$ decay time of the green phosphor ($SrGa_2S_4$:Eu) was about 0.2 msec. The color distribution caused by nonuniformity in coating layer thickness of the phosphor-containing diffusion film could not observed with naked eye. Moreover, excellent light-diffusing function was achieved.

Example 2B

Illuminating Device Having a Diffusion Film Disposed Outside a CCFL and Provided with a Light-Diffusing Layer Containing a Green Phosphor ($SrGa_2S_4$:Eu)

The binder V4263 (produced by Dainippon Ink and Chemicals, Inc.) used in Example 1B was replaced with T5265L (produced by Dainippon Ink and Chemicals, Inc.) and a coating material containing components (a) to (d) below was prepared. The coating material was applied on a transparent supporting member 6 and dried to form a diffusion layer 8 so as to prepare a diffusion film 9.

| | |
|---|---|
| (a) Green phosphor microparticles: $SrGa_2S_4$:Eu | 10 wt % |
| (b) Diffusing particles: PMMA particles (8 μm dia.) | 27 wt % |
| (c) Binder: T5265L (produced by Dainippon Ink and Chemicals, Inc.) | 21 wt % |
| (d) Solvent: methyl ethyl ketone | 42 wt % |

Components (a) to (d) were mixed with a stirrer (HM-800 produced by Keyence Corporation) for 1 minute to prepare a coating material. The coating material was applied on a PET substrate (transparent supporting member 6) (A4300 produced by Toyobo Co., Ltd., 188 μm in thickness) with a bar coater. The applied coating material was dried for 2 minutes at 80° C. to prepare a diffusion film 9. The thickness of the applied film was 25 μm. Evaluation was conducted as in EXAMPLE 1B. The results were substantially the same.

Example 3B

Illuminating Device Having a Diffusion Film Disposed Outside a CCFL and Provided with a Light-Diffusing Layer Containing a Green Phosphor ($SrGa_2S_4$:Eu)

The binder V4263 (produced by Dainippon Ink and Chemicals, Inc.) used in Example 1B was replaced with Vylon 885 (produced by Toyobo Co., Ltd.) and a coating material containing components (a) to (d) below were prepared. The coating material was applied on a transparent supporting member 6 and dried to form a diffusion layer 8 so as to prepare a diffusion film 9.

| | |
|---|---|
| (a) Green phosphor microparticles: $SrGa_2S_4$:Eu | 10 wt % |
| (b) Diffusing particles: PMMA particles (8 μm dia.) | 27 wt % |
| (c) Binder: Vylon 885 (produced by Toyobo Co., Ltd.) | 21 wt % |
| (d) Solvent: methyl ethyl ketone | 42 wt % |

Components (a) to (d) were mixed with a stirrer (HM-800 produced by Keyence Corporation) for 1 minute to prepare a coating material. The coating material was applied on a PET substrate (transparent supporting member 6) (A4300 produced by Toyobo Co., Ltd., 188 μm in thickness) with a bar coater. The applied coating material was dried for 2 minutes at 80° C. to prepare a diffusion film 9. The thickness of the applied film was 25 μm. Evaluation was conducted as in EXAMPLE 1B. The results were substantially the same. Vylon 885 (produced by Toyobo Co., Ltd.) is a polyester resin soluble in a common organic solvent such as methyl ethyl ketone, toluene, or the like.

Example 4B

Illuminating Device Having a Diffusion Film Disposed Outside a CCFL and Provided with a Light-Diffusing Layer Containing a Green Phosphor ($SrGa_2S_4$:Eu)

A coating material containing components (a), (c), and (d) below was prepared as in EXAMPLE 2B but without the diffusing particles, and the coating material was applied on a transparent supporting member 6 and dried to form a diffusion layer 8 so as to prepare a diffusion film 9.

| | | |
|---|---|---|
| (a) Green phosphor microparticles: $SrGa_2S_4$:Eu | 18 wt % |
| (c) Binder: T5265L (produced by Dainippon Ink and Chemicals, Inc.) | 27 wt % |
| (d) Solvent: methyl ethyl ketone | 55 wt % |

Components (a), (c), and (d) were mixed with a stirrer (HM-800 produced by Keyence Corporation) for 1 minute to prepare a coating material. The coating material was applied on a PET substrate (transparent supporting member 6) (A4300 produced by Toyobo Co., Ltd., 188 μm in thickness) with a bar coater. The applied coating material was dried for 2 minutes at 80° C. to prepare a diffusion film 9. The thickness of the applied film was 23 μm. Evaluation was conducted as in EXAMPLE 1B. The results were substantially the same.

Example 5B

Illuminating Device Having a Diffusion Film Disposed Outside a CCFL and Provided with a Light-Diffusing Layer Containing a Green Phosphor ($SrGa_2S_4$:Eu)

A coating material containing components (a), (c), and (d) below was prepared as in EXAMPLE 3B but without the diffusing particles, and the coating material was applied on a transparent supporting member 6 and dried to form a diffusion layer 8 so as to prepare a diffusion film 9.

The components not including the diffusing particles were as follows:

| | | |
|---|---|---|
| (a) Green phosphor microparticles: $SrGa_2S_4$:Eu | 18 wt % |
| (c) Binder: Vylon 885 (produced by Toyobo Co., Ltd.) | 30 wt % |
| (d) Solvent: methyl ethyl ketone | 52 wt % |

Components (a), (c), and (d) were mixed with a stirrer (HM-800 produced by Keyence Corporation) for 1 minute to prepare a coating material. The coating material was applied on a PET substrate (A4300 produced by Toyobo Co., Ltd.). The applied coating material was dried for 2 minutes at 80° C. to prepare a diffusion film 9. The thickness of the applied film was 22 μm. Evaluation was conducted as in EXAMPLE 1B. The results were substantially the same.

Example 6B

Illuminating Device Having a Diffusion Film Including a Light-Diffusing Layer Containing a Green Phosphor (($Sr,Ba,Ca,Mg)_2SiO_4$:Eu) and Disposed Outside a CCFL The green phosphor ($SrGa_2S_4$:Eu) used in EXAMPLE 1B was replaced with $(Sr,Ba,Ca,Mg)_2SiO_4$:Eu to prepare a coating material. The coating material was applied on a transparent supporting member 6 and dried to form a diffusion layer 8 so as to form a diffusion film 9. The $1/10$ decay time of the green phosphor $(Sr,Ba,Ca,Mg)_2SiO_4$:Eu was evaluated.

As in EXAMPLE 1B, a diffusion film containing a green phosphor $(Sr,Ba,Ca,Mg)_2SiO_4$:Eu was prepared, and an illuminating device including this diffusion film and a CCFL having an inner wall on which a blue phosphor $(Sr_x,Ba_y,Ca_z, Mg_{(1-x-y-z)})_5(PO_4)_3Cl$:Eu and a red phosphor $Y_2O_3$:Eu were applied was made and used as a backlight of a liquid crystal panel. The $1/10$ decay time of the green phosphor $(Sr,Ba,Ca, Mg)_2SiO_4$:Eu was also about 0.2 msec.

Example 7B

Illuminating Device Having a Diffusion Film Including a Light-Diffusing Layer Containing Two Types of Green Phosphors ($SrGa_2S_4$:Eu and $(Sr,Ba,Ca,Mg)_2SiO_4$:Eu), the Diffusion Film being Disposed Outside a CCFL A coating material containing components (a1), (a2), and (b) to (e) below was prepared by using two-types of green phosphors ($SrGa_2S_4$:Eu and $(Sr,Ba,Ca,Mg)_2SiO_4$:Eu) to adjust the chromaticity, and the coating material was applied on a transparent supporting member 6 and dried to form a diffusion layer 8 so as to prepare a diffusion film 9.

| | | |
|---|---|---|
| (a1) Green phosphor: $SrGa_2S_4$:Eu | 11 wt % |
| (a2) Green phosphor: $(Sr,Ba,Ca,Mg)_2SiO_4$:Eu | 14 wt % |
| (b) Diffusing particles: PMMA particles (8 μm dia.) | 32 wt % |
| (c) Binder: Unidic V4263 (produced by Dainippon Ink and Chemicals, Inc.) | 33 wt % |
| (d) Solvent: methyl ethyl ketone | 9.4 wt % |
| (e) Photoinitiator: Darocur 1173 | 0.6 wt % |

Components (a1), (a2), and (b) to (e) were mixed with a stirrer (HM-800 produced by Keyence Corporation) for 1 minute to prepare a coating material. The coating material was applied on a PET substrate (transparent supporting member 6) (A4300 produced by Toyobo Co., Ltd., 188 μm in thickness) with a bar coater. The applied coating material was dried for 2 minutes at 80° C. and cured by applying an energy of 1000 mJ/cm² to prepare a diffusion film 9. The thickness of the applied film was 25 μm.

Whereas the chromaticities of the two-types of phosphor microparticles when they were applied alone were (0.2640, 0.6555) and (0.2740, 0.6104), respectively, the chromaticity of the mixture of the two types of phosphor microparticles was (0.2690, 0.6342). This was substantially the same as the intermediate point, (0.2690, 0.6330), of the chromaticity points of the diffusion films respectively containing the two types of phosphors. In other words, a chromaticity substantially equal to the intermediate point of the chromaticity points of two types of phosphors can be obtained by using two types of phosphors with different chromaticities.

Comparative Examples (No. 3)

Comparative Example 2A

A coating material was prepared as in EXAMPLE 1B but without the diffusing particles, applied on a transparent supporting member 6, and dried to form a diffusion layer 8 so as to prepare a diffusion film 9. The diffusion film had low diffusibility and luminance distribution was confirmed by observation with naked eye.

Comparative Example 2B

A coating material containing components (a) to (e) below with fewer diffusion particles than in EXAMPLE 1B were prepared, and the coating material was applied on a transparent supporting member 6 and dried to form a diffusion layer 8 so as to prepare a diffusion film 9. The diffusion film had low diffusibility and luminance distribution was confirmed by observation with naked eye.

| | | |
|---|---|---|
| (a) | Green phosphor microparticles: $SrGa_2S_4$:Eu | 16 wt % |
| (b) | Diffusing particles: PMMA particles (8 μm dia.) | 16 wt % |
| (c) | Binder: Unidic V4263 (produced by Dainippon Ink and Chemicals, Inc.) | 64 wt % |
| (d) | Solvent: methyl ethyl ketone | 3.4 wt % |
| (e) | Photoinitiator: Darocur 1173 | 0.6 wt % |

Although the description above concern illuminating devices incorporating particular phosphors, they are mere examples and do not limit the scope of the present invention. For example, the structures shown in FIGS. 1A to 10 can employ following phosphors. In order to conduct high-speed moving image display by blinking the fluorescent lamp at 120 Hz, the 1/10 decay time of the phosphor should be 0.2 msec or less.

Examples of blue inorganic phosphors that can emit a color in the blue to blue-green range include alkaline earth metal halogen apatite phosphors, alkaline earth metal halophosphate phosphors, alkaline earth metal aluminate phosphors, alkaline earth metal acid silicon nitride phosphors, and alkaline earth metal silicon nitride phosphors.

Specific examples thereof include $Ca_{10}(PO_4)_6Cl_2$:Eu, $Sr_{10}(PO_4)_6Cl_2$:Eu, $(Sr,Mg,Ca)_{10}(PO_4)_6Cl_2$:Eu, $(Sr,Ca)_{10}(PO_4)_6Cl_2$:Eu, $(Sr,Ca)_{10}(PO_4)_6Cl_2.nB_2O_3$:Eu, $(Sr,Ca,Ba)_5(PO_4)_3Cl$:Eu, $(Ba,Ca,Mg)_5(PO_4)_3Cl$:Eu, $(Ba,Sr)_5(PO_4)_3(F,Cl)$:Eu, $Sr_5(PO_4)_3Cl$:Eu, $(Sr,Mg)_2P_2O_7$:Eu, $Sr_2P_2O_7$:Eu, $BaMgAl_{10}O_{17}$:Eu, $(Ba,Mg)Al_{10}O_{17}$:Eu, $BaMg_2Al_{16}O_{27}$:Eu, $(Ba,Mg)_2Al_{15}O_{27}$:Eu, $Sr_4Al_{14}O_{25}$:Eu, $Ba_3MgSi_2O_8$:Eu, $Ca_2B_5O_9Cl$:Eu, $BaSi_2O_2N_2$:Eu, SrS:Eu, (Ca,Ba,Sr)S:Eu, $Y_2SiO_5$:Ce, and $La_{0.7}Gd_{0.3}OBr$:Ce.

Examples of green inorganic phosphors that emit a color in a green to orange range include a rare earth aluminate phosphor, an alkaline earth metal aluminate phosphor at least activated by Eu, an alkaline earth metal silicate phosphor at least activated by Eu, an alkaline earth metal acid silicon nitride phosphor at least activated by Eu or Ce, and an alkaline earth metal gallium sulfide phosphor at least activated by Eu or Ce having garnet structures.

Specific examples thereof include $SrGa_2S_4$:Eu, $(Sr,Ca,Ba)(Al,Ga)_2S_4$:Eu, $(Ca,Sr,Ba)Ga_2S_4$:Eu, $BaAl_2O_4$:Eu, $SrAl_2O_4$:Eu, $(Ba,Sr)Al_2O_4$:Eu, $CaAl_2O_4$:Eu, $Sr_4Al_4O_{25}$:Eu, $Ba_2SiO_4$:Eu, $(Sr,Ba,Mg)_2SiO_4$:Eu, $(Ba,Sr)_2SiO_4$:Eu, $Ba_2MgSi_2O_7$:Eu, $Ca_{3(1-x)}Mg_3Si_4O_{28}$:$Eu_x$, $Ba_2(Mg,Zn)Si_2O_7$:Eu, $BaSi_2O_2N_2$:Eu, $(Sr,Ca)Si_2O_2N_2$:Eu, β-SiAlON:Eu, $Lu_3Al_5O_{12}$:Ce, $Y_3Al_5O_{12}$:Ce, $Y_3(Al,Ga)_5O_{12}$:Ce, $(Y,Gd)_3Al_5O_{12}$:Ce, $Y_2(Al,Ga)_5O_{12}$:Ce, and $Ca_3Sc_2Si_3O_{12}$:Ce.

A monoclinic or rhombic alkaline earth metal silicon nitride phosphor or the like may be used as a red inorganic phosphor that emits light having a color in the orange to red range.

Specific examples thereof include $Ca_2Si_5N_8$:Eu, $Sr_2Si_5N_8$:Eu, $(Sr,Ca)_2Si_5N_8$:Eu, $Ba_2Si_5N_8$:Eu, $CaAlSiN_3$:Eu, $YVO_4$:Eu, $Y(P,V)O_4$:Eu, $Sr_2CeO_4$:Eu, $(Y,Gd)BO_3$:Eu, SrS:Eu, CaS:Eu, Ca,Sr)S:Eu, (CaBaSr)S:Eu, $Y_2O_3$:Eu, $Gd_2O_2S$:Eu, $La_2O_2S$:Eu, $Y_2O_2S$:Eu, and $SrY_2S_4$:Eu.

The fluorescent lamp constituting the illuminating device is not limited to a straight tube-type fluorescent lamp having a straight line shape as shown in FIGS. 1A to 10. A curved fluorescent lamp such as a U-shaped or spiral fluorescent lamp may also be used. The number of the fluorescent lamps constituting the illuminating device may be any.

The diffusion plate 16 on which the green phosphor layer 18 is formed may contain an existing light-diffusing agents of a variety of types. The green phosphor-containing diffusion layer (light-diffusing layer) 8 may contain resin microparticles such as polymethyl methacrylate (PMMA) particles, cross-linked polystyrene (PS) particles, or the like, or microparticles composed of an inorganic material. Various binders may be used in forming the green phosphor layer 18 and the green phosphor-containing diffusion layer (light-diffusing layer) 8.

What is claimed is:

1. An illuminating device comprising:
   a fluorescent lamp including a blue phosphor and a red phosphor applied on an inner surface, the fluorescent lamp emitting blue light and red light from the blue phosphor and the red phosphor, respectively; and
   a green phosphor layer disposed outside the fluorescent lamp, the green phosphor layer containing a green phosphor containing $Eu^{2+}$ or $Ce^{3+}$ as a luminescent center,
   wherein green light emitted from the green phosphor excited by the blue light is mixed with the red light and the blue light so that white light is emitted from the illuminating device.

2. The illuminating device according to claim 1, wherein the green phosphor layer is disposed on an outer surface of the fluorescent lamp.

3. The illuminating device according to claim 1, further comprising a light-diffusing plate outside the fluorescent lamp, wherein the green phosphor layer is disposed on the light-diffusing plate.

4. The illuminating device according to claim 1, wherein the green phosphor layer has light diffusibility and serves as a light-diffusing plate.

5. The illuminating device according to claim 1, wherein the 1/10 decay time of the green phosphor is 0.2 msec or less.

6. The illuminating device according to claim 1, wherein the fluorescent lamp is a cold cathode fluorescent lamp.

7. The illuminating device according to claim 1, wherein the green phosphor layer is an inorganic phosphor.

8. A display apparatus comprising any one of the illuminating devices according to claims 1 to 6.

9. The illuminating device according to claim 3, wherein the green phosphor layer contains different types of green phosphors and is disposed on the light-diffusing plate.

10. The illuminating device according to claim 4, wherein the green phosphor layer contains different types of green phosphors.

11. The illuminating device according to claim 4, wherein the green phosphor layer contains light-diffusing particles.

12. The illuminating device according to claim 11, wherein the light-diffusing particles are resin microparticles.

13. An light-diffusing film comprising:
    a transparent sheet substrate; and
    a light-diffusing layer formed on the transparent sheet substrate, the light-diffusing layer containing a resin binder and a green phosphor containing $Eu^{2+}$ or $Ce^{3+}$ as a luminescent center, wherein the light-diffusing layer is disposed outside a fluorescent lamp having an inner surface on which a blue phosphor and a red phosphor are applied so that the fluorescent lamp emits blue light and red light, and is used in an illuminating device that emits white light as green light emitted from the green phosphor excited by the blue light mixes with the red light and the blue light.

14. The light-diffusing film according to claim 13, wherein the light-diffusing layer contains different types of green phosphors.

15. The light-diffusing film according to claim 13, wherein the light-diffusing layer contains light-diffusing particles.

16. The light-diffusing film according to claim 13, wherein the $1/10$ decay time of the green phosphor is 0.2 msec or less.

17. The light-diffusing film according to claim 15, wherein the light-diffusing particles are resin microparticles.

18. The display apparatus according to claim 8, further comprising a liquid crystal panel.

19. The display apparatus according to claim 8, wherein the illuminating device is used as a backlight.

20. The display apparatus according to claim 19, further comprising a pixel unit, wherein ON-OFF of the pixel unit is synchronized with blinking of the backlight.

* * * * *